United States Patent
Park et al.

(10) Patent No.: US 10,321,142 B2
(45) Date of Patent: Jun. 11, 2019

(54) METHOD AND APPARATUS FOR VIDEO ENCODING FOR ADAPTIVE ILLUMINATION COMPENSATION, METHOD AND APPARATUS FOR VIDEO DECODING FOR ADAPTIVE ILLUMINATION COMPENSATION

(71) Applicant: SAMSUNG ELECTRONICS CO., LTD., Suwon-si (KR)

(72) Inventors: Min-woo Park, Hwaseong-si (KR); Jin-young Lee, Hwaseong-si (KR); Yong-jin Cho, Seoul (KR); Byeong-doo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 14/905,364

(22) PCT Filed: Jul. 15, 2014

(86) PCT No.: PCT/KR2014/006409
§ 371 (c)(1),
(2) Date: Jan. 15, 2016

(87) PCT Pub. No.: WO2015/009041
PCT Pub. Date: Jan. 22, 2015

(65) Prior Publication Data
US 2016/0150238 A1    May 26, 2016

Related U.S. Application Data

(60) Provisional application No. 61/846,189, filed on Jul. 15, 2013.

(51) Int. Cl.
*H04N 19/33* (2014.01)
*H04N 19/186* (2014.01)
(Continued)

(52) U.S. Cl.
CPC .......... *H04N 19/33* (2014.11); *H04N 19/103* (2014.11); *H04N 19/117* (2014.11);
(Continued)

(58) Field of Classification Search
CPC ..................................................... H04N 19/33
(Continued)

(56) References Cited

U.S. PATENT DOCUMENTS 5,818,975 A * 10/1998 Goodwin ............. H04N 1/4072
                                                        345/589
8,295,634 B2   10/2012 Lee et al.
(Continued)

FOREIGN PATENT DOCUMENTS

JP    2011223262 A  * 11/2011 ............. H04N 19/61
JP    2013-110555 A    6/2013
(Continued)

OTHER PUBLICATIONS

Communication dated Oct. 14, 2014 issued by the Int. Searching Authority in counterpart Application No. PCT/KR2014/006409 (PCT/ISA/210 & PCT/ISA/237).
(Continued)

*Primary Examiner* — Dave Czekaj
*Assistant Examiner* — Shanika M Brumfield
(74) *Attorney, Agent, or Firm* — Sughrue Mion, PLLC

(57) ABSTRACT

An interlayer video decoding method includes: selecting a luminance compensation model to be applied to a first layer reference block and determining a luminance compensation parameter for the selected luminance compensation model; and compensating for luminance of the first layer reference block by using the luminance compensation parameter and reconstructing a second layer image comprising a second layer current block. The determining of the luminance compensation parameter comprises determining the lumi-
(Continued)

nance compensation parameter based on any one of a color component of the second layer current block, information about a type of a picture comprising the second layer current block, and a prediction mode of the second layer current block.

15 Claims, 32 Drawing Sheets

(51) Int. Cl.
  *H04N 19/117* (2014.01)
  *H04N 19/103* (2014.01)
  *H04N 19/136* (2014.01)
  *H04N 19/176* (2014.01)
  *H04N 19/187* (2014.01)
  *H04N 19/44* (2014.01)
  *H04N 19/82* (2014.01)
  *H04N 19/59* (2014.01)

(52) U.S. Cl.
  CPC ......... *H04N 19/136* (2014.11); *H04N 19/176* (2014.11); *H04N 19/186* (2014.11); *H04N 19/187* (2014.11); *H04N 19/44* (2014.11); *H04N 19/59* (2014.11); *H04N 19/82* (2014.11)

(58) Field of Classification Search
  USPC .................................................. 375/240.08
  See application file for complete search history.

(56) References Cited

U.S. PATENT DOCUMENTS

| | | | | |
|---|---|---|---|---|
| 2012/0213281 | A1* | 8/2012 | Choi | ................... H04N 19/597 |
| | | | | 375/240.16 |
| 2015/0023422 | A1* | 1/2015 | Zhang | ................... H04N 19/51 |
| | | | | 375/240.16 |
| 2015/0326881 | A1* | 11/2015 | Ikai | ..................... H04N 19/117 |
| | | | | 375/240.12 |

FOREIGN PATENT DOCUMENTS

| | | | |
|---|---|---|---|
| KR | 20070083168 A | * | 8/2007 |
| KR | 10-2008-0108774 A | | 12/2008 |
| KR | 10-2012-0095611 A | | 8/2012 |
| KR | 10-1244917 B1 | | 3/2013 |

OTHER PUBLICATIONS

Jae-Ho Hura et al., "Adaptive illumination change compensation method for multi-view video coding", Journal of broadcast engineering, vol. 11, No. 4, Dec. 2006, pp. 407-419.

Colin Doutre et al., "Color Correction Preprocessing for Multiview Video Coding", IEEE Transactions on Circuits and Systems for Video Technology, vol. 19, No. 9, Sep. 2009, pp. 1400-1405.

* cited by examiner

16X16 FIRST LAYER REFERENCE BLOCK (6500)

16X16 SECOND LAYER CURRENT BLOCK (6100)

CODING UNIT (1010)

METHOD AND APPARATUS FOR VIDEO ENCODING FOR ADAPTIVE ILLUMINATION COMPENSATION, METHOD AND APPARATUS FOR VIDEO DECODING FOR ADAPTIVE ILLUMINATION COMPENSATION

CROSS-REFERENCE TO RELATED APPLICATION

This application claims the benefit of U.S. Provisional Application No. 61/846,189, filed on Jul. 15, 2013, in the Korean Intellectual Property Office, the disclosure of which is incorporated herein in its entirety by reference.

BACKGROUND

1. Field

The present disclosure relates to interlayer video encoding and decoding methods, and more particularly, to a method of adaptively compensating for a luminance difference between interlayer images.

2. Description of the Related Art

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a first layer video and one or more second layer videos. The multi-layer video codec may remove temporal and spatial redundancies of the first layer video and the second layer videos and redundancy between layers, thereby compressing data of the first layer video and the second layer videos.

However, according to positions of cameras, illumination may differ. Then, each camera may not be calibrated to have the same physical characteristic, and thus, image signals may be slightly different from each other. Therefore, a correlation between respectively layer videos may be lowered, and when encoding is performed by referring to images acquired from layers that are at different views, it may be difficult to acquire accurate disparity vectors. Also, as a direct current (DC) component of a residual signal increases, compression efficiency may degrade.

SUMMARY

Provided are methods and apparatuses for reducing an amount of arithmetic operations during luminance compensation performed on a block and using a reference block even though the reference block is located outside a boundary of a reference picture.

Also, provided is a non-transitory computer-readable recording medium having recorded thereon a computer program for executing the above method.

Additional aspects will be set forth in part in the description which follows and, in part, will be apparent from the description, or may be learned by practice of the presented embodiments.

According to an aspect of an embodiment, an interlayer video decoding method includes: reconstructing a first layer image based on encoding information acquired from a first layer bitstream; reconstructing a second layer current block by using interlayer prediction information acquired from a second layer bitstream and a first layer reference block corresponding to the second layer current block that is to be reconstructed in a first layer reconstruction image; selecting a luminance compensation model to be applied to the first layer reference block and determining a luminance compensation parameter for the selected luminance compensation model; and compensating for luminance of the first layer reference block by using the luminance compensation parameter and reconstructing a second layer image comprising the second layer current block, wherein the determining of the luminance compensation parameter comprises determining the luminance compensation parameter based on any one of a color component of the second layer current block, information about a type of a picture comprising the second layer current block, and a prediction mode of the second layer current block.

According to an aspect of another embodiment, an interlayer video decoding apparatus includes: a first layer decoder configured to reconstruct a first layer image based on encoding information acquired from a first layer bitstream; a second layer decoder configured to reconstruct a second layer current block by using interlayer prediction information acquired from a second layer bitstream and a first layer reference block corresponding to the second layer current block that is to be reconstructed in a first layer reconstruction image; and a luminance compensation determiner configured to select a luminance compensation model to be applied to the first layer reference block and determine a luminance compensation parameter for the selected luminance compensation model, wherein the luminance compensation determiner is further configured to determine the luminance compensation parameter based on any one of a color component of the second layer current block, information about a type of a picture comprising the second layer current block, and a prediction mode of the second layer current block, and the second layer decoder is further configured to compensate for luminance of the first layer reference block by using the luminance compensation parameter and reconstruct a second layer image comprising the second layer current block.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Best Mode

An interlayer video decoding method comprising: reconstructing a first layer image based on encoding information acquired from a first layer bitstream, reconstructing a second layer current block by using interlayer prediction information acquired from a second layer bitstream and a first layer reference block corresponding to the second layer current block that is to be reconstructed in a first layer reconstruction image, selecting a luminance compensation model to be applied to the first layer reference block and determining a luminance compensation parameter for the selected luminance compensation model, and compensating for luminance of the first layer reference block by using the luminance compensation parameter and reconstructing a second layer image comprising the second layer current block, wherein the determining of the luminance compensation parameter comprises determining the luminance compensation parameter based on any one of a color component of the second layer current block, information about a type of a picture comprising the second layer current block, and a prediction mode of the second layer current block.

MODE OF THE INVENTION

The present disclosure will now be described more fully with reference to the accompanying drawings, in which embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the invention to those skilled in the art.

Hereinafter, an interlayer video encoding method and an interlayer video decoding method of determining whether to perform luminance compensation based on block characteristics according to various embodiments will be described with reference to FIGS. 1A through 6. A video encoding method and a video decoding method, based on coding units having a tree structure according to various embodiments that are applicable to the interlayer video encoding method and the interlayer video decoding method will be described with reference to FIGS. 7 through 19. In addition, various embodiments to which the video encoding method and the video decoding method will be described with reference to FIGS. 20 through 26.

Hereinafter, an 'image' may denote a still image or a moving image of a video, or a video itself.

Hereinafter, a 'sample' that is data allocated to a sampling location of an image may mean data that is a processing target. For example, pixels in an image of a spatial area may be samples.

An interlayer video encoding apparatus and method and an interlayer video decoding apparatus and method according to an embodiment will now be described with reference to FIGS. 1A through 7.

Figure 1A:
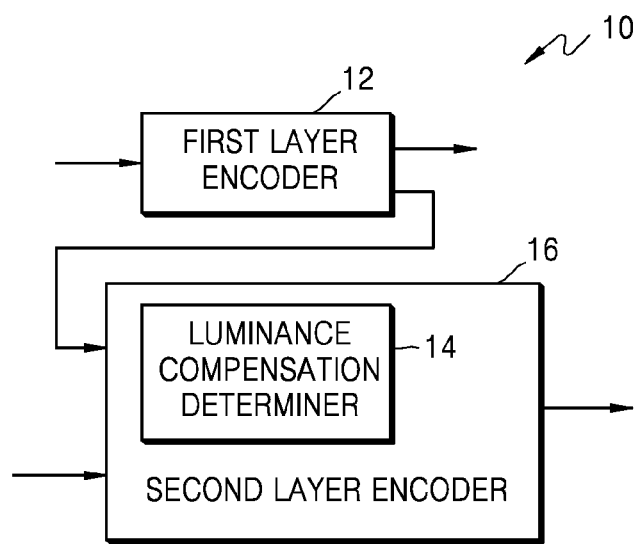
FIG. 1A is a block diagram of an interlayer video encoding apparatus, according to various embodiments.
Figure 1B:
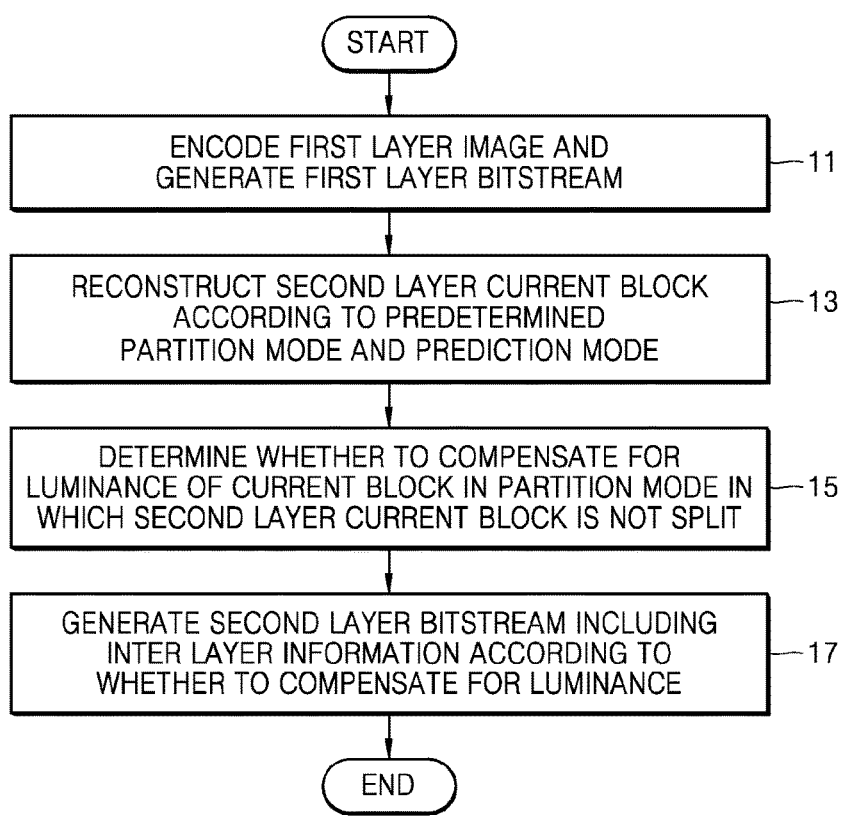
FIG. 1B is a flowchart of an interlayer video encoding method, according to various embodiments.

FIG. 1A is a block diagram of an interlayer video encoding apparatus 10, according to various embodiments. FIG. 1B is a flowchart of an interlayer video encoding method, according to various embodiments.

The interlayer video encoding apparatus 10 according to various embodiments may include a first layer encoder 12, a luminance compensation determiner 14, and a second layer encoder 16. The luminance compensation determiner 14 may be included in the second layer encoder 16. The luminance compensation determiner 14 may be located outside the second layer encoder 16. However, in the specification, a case where the luminance compensation determiner 14 is located inside the second layer encoder 16 will be described.

The interlayer video encoding apparatus 10 according to various embodiments may classify and encode a plurality of image sequences for each layer according to scalable video coding and may output a separate stream including data encoded for each layer. The interlayer video encoding apparatus 10 may encode first layer image sequences and second layer image sequences according to different layers.

The first layer encoder 12 may encode first layer images and output a first layer stream including encoding data of the first layer images.

The second layer encoder 16 may encode second layer images and output a second layer stream including encoding data of the second layer images.

For example, according to scalable video coding based on spatial scalability, low resolution images may be encoded as the first layer images, and high resolution images may be encoded as the second layer images. An encoding result of the first layer images may be output in a first layer stream. An encoding result of the second layer images may be output in a second layer stream.

As another example, a multi-view video may be encoded according to scalable video coding. In this case, center view images may be encoded as first layer images, and left view images and right view images may be encoded as second layer images that refer to the first layer images. Alternatively, when the interlayer video encoding apparatus 10 permits three or more layers such as first, second, and third layers, the center view images may be encoded as the first layer images, the left view images may be encoded as the second layer images, and the right view images may be encoded as third layer images. However, the present invention is not necessarily limited thereto. Layers that the center view images, the left view images, and the right view images are encoded and referred may be changed.

As another example, scalable video coding may be performed according to temporal hierarchical prediction based on temporal scalability. A first layer stream including encoding information generated by encoding images of a base frame rate may be output. Temporal levels may be classified for each frame rate and may be respectively encoded in layers. A second layer stream including encoding information of a high speed frame rate may be output by further encoding images of the high frame rate with reference to the images of the basic frame rate.

Scalable video coding may be performed on a first layer and a plurality of second layers. In the presence of three or more second layers, first layer images, first second layer images, second second layers images, . . . , Kth second layer images may be encoded. Accordingly, an encoding result of the first layer images may be output in the first layer stream, and encoding results of the first second layer images, second second layers images, . . . , Kth second layer images may be respectively output in first, second, . . . Kth second layer streams.

The interlayer video encoding apparatus 10 according to various embodiments may perform inter prediction for predicting a current image by referring to images of a single layer. A motion vector indicating motion information between the current image and a reference image and a residual between the current image and the reference image may be generated through inter prediction.

The interlayer video encoding apparatus 10 may perform inter-layer prediction for predicting prediction information of second layer images by referring to prediction information of the first layer images.

When the interlayer video encoding apparatus 10 according to an embodiment permits three or more layers such as a first layer, a second layer, a third layer, etc., the interlayer video encoding apparatus 10 may perform inter-layer prediction between a first layer image and a third layer image and inter-layer prediction between a second layer image and the third layer image according to a multi-layer prediction structure.

A position differential component between the current image and a reference image of a different layer and a residual between the current image and the reference image of the different layer may be generated through inter-layer prediction.

An inter-layer prediction structure will be described in detail with reference to FIG. 3 later.

The interlayer video encoding apparatus 10 according to various embodiments encodes each video image for each respective block according to each layer. A block may have a square shape, a rectangular shape, or any geometric shape and is not limited to a data unit having a predetermined size. A block may be a maximum coding unit, a coding unit, a prediction unit, a transformation unit, or the like from among coding units according to a tree structure. The maximum encoding unit including coding units having the tree structure is diversely referred to as a coding block unit, a block tree, a root block tree, a coding tree, a coding root or a tree trunk. Video encoding and decoding methods based on coding units having the tree structure will now be described with reference to FIGS. 8 through 20.

Inter prediction and inter layer prediction may be performed based on a data unit of the coding unit, the prediction unit, or the transformation unit.

The first layer encoder 12 according to various exemplary embodiments may perform source coding operations including inter prediction or intra prediction on the first layer images to generate symbol data. The symbol data represents a sample value of each coding parameter and a sample value of the residual.

For example, the first layer encoder 12 may perform inter prediction, or intra prediction, transformation and quantization on samples in a data unit of the first layer images, generate symbol data, perform entropy encoding on the symbol data, and generate a first layer stream.

The second layer encoder 16 may encode the second layer images based on the coding units having the tree structure. The second layer encoder 16 may perform inter/intra prediction, transformation and quantization on samples in a data unit of the second layer images, generate symbol data, perform entropy encoding on the symbol data, and generate an second layer stream.

The second layer encoder 16 according to various embodiments may perform inter layer prediction that predicts a second layer image by using prediction information of a first layer image. The second layer encoder 16 may determine prediction information of a second layer current image by using prediction information of a first layer reconstructed image and generate a second layer prediction image based on the determined prediction information to encode a prediction error between a second layer original image and the second layer prediction image, in order to encode the second layer original image among the second layer image sequences through the inter layer prediction structure.

The second layer encoder 16 may perform inter layer prediction on the second layer image for each block such as the coding unit or the prediction unit and determine a block of the first layer image to which a block of the second layer image is to refer. For example, a reconstruction block of the first layer image positioned in correspondence to a position of a current block image in the second layer image may be determined. The second layer encoder 16 may determine a second layer prediction block by using the first layer reconstruction block corresponding to the second layer block.

The second layer encoder 16 may use the second layer prediction block determined by using the first layer reconstruction block as a reference image for inter layer prediction of a second layer original block. The second layer encoder 16 may perform entropy encoding on an error between a sample value of the second layer prediction block and a sample value of the second layer original block, i.e., a residual according to inter layer prediction, using the first layer reconstruction image.

As described above, the interlayer video encoding apparatus 10 may encode a current layer image sequence by referring to first layer reconstruction images through the inter layer prediction structure. However, the interlayer video encoding apparatus 10 according to various embodiments may encode the second layer image sequence according to a single layer prediction structure without referring to different layer samples. Thus, it is not limited to construe that the second layer encoder 16 performs only inter-layer prediction in order to encode the second layer image sequence.

As described above, when the interlayer video encoding apparatus 10 encodes a multi-view video, the first layer encoder 12 may encode a first view video, and the second layer encoder 16 may encode a second view video. Video for each view may be captured by different cameras or may be acquired using different lenses. Since characteristics of a capturing angle, illumination, or an imaging tool (a camera, a lens, etc.) for each view may be different, a phenomenon may occur whereby luminance is not identical between videos acquired for each view. Such a luminance mismatch phenomenon may be related to a difference in a sample value between videos for each view.

If luminance is not identical between videos for each view, since the amount of interlayer prediction errors further increases, encoding efficiency may be reduced. Accordingly, considering luminance inconsistency between views, the luminance compensation determiner 14 of the interlayer video encoding apparatus 10 may compensate for and encode a luminance difference of video for each view. For example, a luminance difference between a first view image encoded by the first layer encoder 12 and a second view image encoded by the second layer encoder 16 may be encoded. Since the luminance difference of the second view image with respect to the first view image is encoded, luminance may be compensated for when the second layer encoder 16 encodes a second view video.

A predetermined parameter may be used to compensate for a luminance difference between a first layer block and a second layer block according to an embodiment.

A luminance compensation parameter for compensating for the luminance difference in a block unit may be transmitted by being included in a bitstream or may be determined by utilizing peripheral pixel values of a second layer current block and peripheral pixel values of a first layer reconstruction block corresponding to the current block. A method of determining a luminance compensation parameter will be described below with reference to FIG. 4.

Meanwhile, since residuals are predicted between layers in an inter layer prediction structure, an encoding operation of predicting a luminance difference between layers may increase an amount of arithmetic operations. Accordingly, the luminance compensation determiner 14 according to various embodiments may adaptively determine a luminance compensation model and luminance compensation parameters that are used when luminance compensation is performed in consideration of characteristics in a predetermined data unit such as a slice of a current image or a block.

A detailed operation of the interlayer video encoding apparatus 10 that considers compensation of luminance will be described with reference to FIG. 1B below.

FIG. 1B is a flowchart of an interlayer video encoding method, according to various embodiments.

In operation 11, the first layer encoder 12 may encode a first layer image and generate a first layer bitstream including sample values of generated encoding information.

In operation 13, the second layer encoder 16 may encode a second layer image and reconstruct a second layer current block that is determined as a predetermined partition mode and prediction mode, in order to generate a second layer bitstream including sample values of generated encoding information. That is, the second layer encoder 16 may reconstruct the second layer current block using a first layer reference block corresponding to the second layer current block that is to be reconstructed in a first layer reconstruction image according to the predetermined partition mode and prediction mode. It may be interpreted that if the interlayer video encoding apparatus 10 encodes a multiview video, the first layer image corresponds to a first view image, and the second layer image corresponds to a second view image. The first layer encoder 12 and the second layer encoder 16 may split each image into blocks and encode each image for each respective block.

In operation 15, the luminance compensation determiner 14 may determine a luminance compensation parameter based on any one of a color component of the second layer current block, information about a type of a picture including the second layer current block, and a prediction mode of the second layer current block.

In operation 17, the second layer encoder 16 may generate a second layer bitstream including interlayer prediction information between the first layer reference block and the second layer current block of which luminance is compensated by using the determined luminance compensation parameter.

For example, the second layer encoder 16 may generate the second layer bitstream including partition mode information, prediction mode information, and luminance compensation information when the second layer reconstruction block corresponds to a partition mode in which the second layer reconstruction block is not split and a prediction mode other than an intra prediction mode. The second layer encoder 16 may perform inter layer prediction that encodes an error between the first layer image and the second layer image, and thus residuals between blocks (second layer blocks) of the second layer image and reference blocks (first layer reference blocks) of the first layer image corresponding to the blocks of the second layer image may be encoded. Thus, the second layer bitstream may include various pieces of inter layer prediction information indicating inter layer encoding methods and inter layer residuals.

Operation 15 will now be described in more detail. The second layer encoder 16 may determine partition mode information indicating a partition mode of a second layer block and prediction mode information indicating a prediction mode of the second layer block. For example, the partition mode information of the second layer block may be determined in a merge mode or advanced motion vector prediction (AMVP) mode. The second layer encoder 16 may reconstruct the second layer current block by using the first layer reference block corresponding to the second layer current block that is to be reconstructed in the first layer reconstruction image according to the predetermined partition mode and prediction mode.

The luminance compensation determiner 14 may determine the luminance compensation model applied for the second layer block determined by using the first layer reference block and the second layer current block and the luminance compensation parameter for the luminance compensation model. That is, the luminance compensation determiner 14 may determine the luminance compensation model for the first layer reference block and the luminance compensation parameter.

In operation 17, the second layer encoder 16 may generate the second layer bitstream including the interlayer prediction information between the first layer reference block and the second layer current block of which luminance is determined according to whether luminance compensation is performed according to the determined luminance compensation parameter.

If the luminance of the first layer image is adjusted in consideration of the second layer image, since errors between the first layer image and the second layer image are further reduced, encoding efficiency of inter layer prediction may be improved. Compensation of luminance may be prioritized in a specific encoding mode according to an encoding mode of a block.

The interlayer video encoding apparatus 10 according to various embodiments may include a central processor (not shown) that generally controls the first layer encoder 12, the luminance compensation determiner 14, and the second layer encoder 16. Alternatively, the first layer encoder 12, the luminance compensation determiner 14, and the second layer encoder 16 may operate by their respective processors (not shown), and the interlayer video encoding apparatus 10 may generally operate according to interactions of the processors (not shown). Alternatively, the first layer encoder 12, the luminance compensation determiner 14, and the second layer encoder 16 may be controlled according to the control of an external processor (not shown) of the interlayer video encoding apparatus 10.

The interlayer video encoding apparatus 10 may include one or more data storage units (not shown) in which input and output data of the first layer encoder 12, the luminance compensation determiner 14, and the second layer encoder 16 is stored. The interlayer video encoding apparatus 10 may include a memory control unit (not shown) that observes data input and output of the data storage units (not shown).

The interlayer video encoding apparatus 10 may operate in connection with an internal video encoding processor or an external video encoding processor so as to output video encoding results, thereby performing a video encoding operation including transformation. The internal video encoding processor of the interlayer video encoding apparatus 10 may be implemented by a central processor or a graphic processor as well as a separate processor.

Figure 2A:
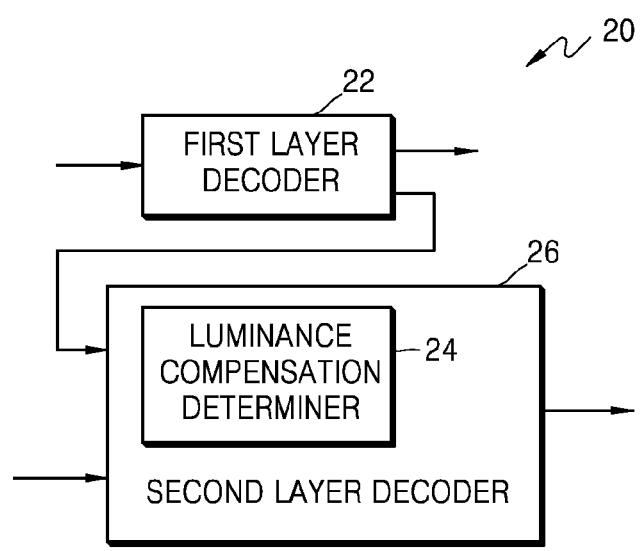
FIG. 2A is a block diagram of an interlayer video decoding apparatus, according to various embodiments.

FIG. 2A is a block diagram of an interlayer video decoding apparatus 20, according to various embodiments.

The interlayer video decoding apparatus 20 according to various embodiments may include a second layer encoder 22, a luminance compensation determiner 24, and a second layer decoder 26. The luminance compensation determiner 24 may be included in the second layer decoder 26. The luminance compensation determiner 24 according to another embodiment may be located outside the second layer decoder 26.

The interlayer video decoding apparatus 20 according to various embodiments may receive bitstreams for each layer according to scalable encoding. The number of layers of the bitstreams received by the interlayer video decoding apparatus 20 is not limited. However, for convenience of description, an embodiment in which the second layer encoder 22 of the interlayer video decoding apparatus 20 receives and decodes a first layer stream and the second layer decoder 26 receives and decodes a second layer stream will be described in detail.

For example, the interlayer video decoding apparatus 20 based on spatial scalability may receive streams in which image sequences of different resolutions are encoded according to different layers. A low resolution image sequence may be reconstructed by decoding the first layer stream, and a high resolution image sequence may be reconstructed by decoding the second layer stream.

As another example, a multi-view video may be decoded according to scalable video coding. When a stereoscopic video stream is received in multiple layers, the first layer stream may be decoded to reconstruct left view images. The second layer stream may be further decoded to the first layer stream to reconstruct right view images.

Alternatively, when a multi-view video stream is received in multiple layers, the first layer stream may be decoded to reconstruct center view images. The second layer stream may be further decoded to the first layer stream to reconstruct the left view images. A third layer stream may be further decoded to the first layer stream to reconstruct the right view images.

As another example, scalable video coding based on temporal scalability may be performed. The first layer stream may be decoded to reconstruct base frame rate images. The second layer stream may be further decoded to the first layer stream to reconstruct high speed frame rate images.

In the presence of three or more second layers, first layer images may be reconstructed from the first layer stream. If the second layer stream is further decoded by referring to the first layer reconstruction images, second layer images may be further reconstructed. If a Kth layer stream is further decoded by referring to the second layer reconstruction images, Kth layer images may be further reconstructed.

The interlayer video decoding apparatus 20 may obtain encoded data of the first layer images and second layer images from the first layer stream and the second layer stream and may further obtain a motion vector generated through inter prediction and prediction information generated through inter layer prediction.

For example, the interlayer video decoding apparatus 20 may decode inter-predicted data for each layer and may decode inter layer-predicted data between a plurality of layers. Reconstruction may be performed through motion compensation and inter layer decoding based on a coding unit or a prediction unit.

Motion compensation for a current image is performed by referring to reconstruction images predicted through inter prediction of a same layer on each layer stream, and thus images may be reconstructed. Motion compensation means an operation of synthesizing a reference image determined by using a motion vector of the current image and a residual of the current image and reconfiguring a reconstruction image of the current image.

The interlayer video decoding apparatus 20 may perform inter-layer decoding with reference to prediction information of the first layer images so as to decode a second layer image predicted through inter-layer prediction. Inter-layer decoding means an operation of reconfiguring a reconstruction image of the current image by synthesizing a reference image of a different layer determined to predict a current image and a residual of the current image.

The interlayer video decoding apparatus 20 according to an embodiment may perform inter-layer decoding for reconstructing the third layer images predicted with reference to the second layer images. An inter layer prediction structure will be described in detail with reference to FIG. 3 later.

However, the second layer encoder 26 according to various embodiments may decode the second layer stream without referring to the first layer image sequence. Thus, it is not limited to construe that the second layer encoder 26 performs only inter-layer prediction in order to decode the second layer image sequence.

The interlayer video decoding apparatus 20 decodes each image of a video for each block. A block according to an exemplary embodiment may include a maximum encoding unit, an encoding unit, a prediction unit, a transformation unit, etc. among encoding units according to a tree structure.

The first layer encoder 22 may decode the first layer image by using encoding symbols of a parsed first layer image. If the interlayer video decoding apparatus 20 receives encoded streams based on coding units having a tree structure, the first layer encoder 22 may perform decoding based on the coding units having the tree structure for each maximum coding unit of the first layer stream.

The first layer encoder 22 may perform entropy encoding for each maximum coding unit and may obtain encoding information and encoded data. The first layer encoder 22 may perform inverse quantization and inverse transformation on the encoded data obtained from streams to reconstruct a residual. The first layer encoder 22 according to another embodiment may directly receive a bitstream of quantized transformation coefficients. A residual of the images may be reconstructed as a result of performing inverse quantization and inverse transformation on the quantized transformation coefficients.

The first layer encoder 22 may reconstruct the first layer images by synthesizing a prediction image and the residual through motion compensation between same layer images.

The second layer encoder 26 may generate a second layer prediction image by using samples of a first layer reconstruction image according to the inter layer prediction structure. The second layer encoder 26 may decode the second layer stream to obtain a prediction error according to inter layer prediction. The second layer encoder 26 may combine the second layer prediction image and the prediction error, thereby generating the second layer reconstruction image.

The second layer encoder 26 may determine the second layer prediction image using the first layer reconstruction image decoded by the first layer encoder 22. The second layer encoder 26 may determine a block of the first layer image to which a block such as a coding unit or a prediction unit of the second layer image is to refer according to the inter layer prediction structure. That is, a block of the first layer image to which a block of the second layer image is to refer may be determined. For example, a reconstruction block of the first layer image located in the second layer image in correspondence to a location of a current block may be determined. The second layer encoder 26 may determine a second layer prediction block using a first layer reconstruction block corresponding to a second layer block.

The second layer encoder 26 may use the second layer prediction block determined using the first layer reconstruction block according to an inter layer prediction structure as a reference image for interlayer predicting a second layer original block. In this case, the second layer encoder 26 may reconstruct the second layer block by synthesizing a sample value of the second layer prediction block determined using the first layer reconstruction image and a residual according to interlayer prediction.

According to spatial scalable video coding, when the first layer decoder 22 reconstructs the first layer image of a different resolution from that of the second layer image, the second layer decoder 26 may interpolate the first layer reconstruction image to resize the first layer reconstruction image to have the same resolution as that of the second layer original image. The interpolated first layer reconstruction image may be determined as the second layer prediction image for interlayer prediction.

Therefore, the first layer decoder 22 of the interlayer video decoding apparatus 20 may reconstruct the first layer image sequence by decoding the first layer stream, and the second layer decoder 26 may reconstruct the second layer image sequence by decoding the second layer stream.

In consideration of a luminance mismatch between views, the luminance compensation determiner 24 of the interlayer video decoding apparatus 20 may compensate for and reconstruct a luminance difference between videos for each view. For example, a luminance difference between a first view image decoded by the first layer decoder 22 and a second view image decoded by the second layer decoder 26 may be acquired from a bitstream. Since the luminance difference between the second view image and the first view image is acquired, the luminance compensation for the first layer image may be performed when second layer decoder 26 decodes a second view video.

The luminance compensation determiner 24 according to various embodiments may adaptively select a luminance compensation model used when luminance compensation is performed in consideration of characteristics of a predetermined data unit such as a slice of a current image or a block and may determine luminance compensation parameters for the selected luminance compensation model.

A detailed operation of the interlayer video decoding apparatus 20 that considers compensation of luminance will now be described with reference to FIG. 2B.

Figure 2B:
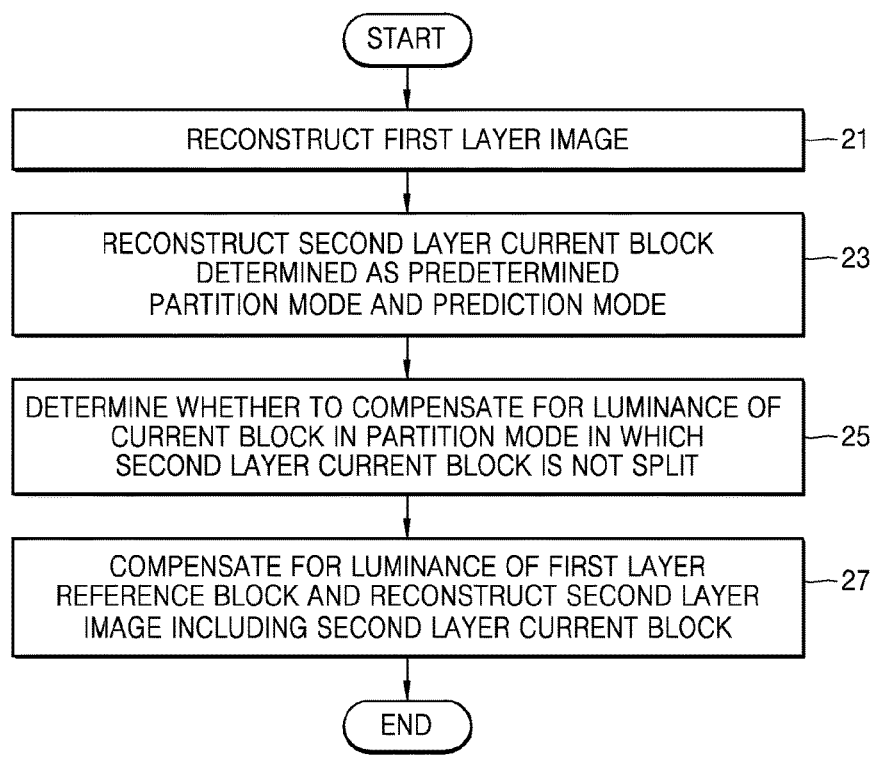
FIG. 2B is a flowchart of an interlayer video decoding method, according to various embodiments.

FIG. 2B is a flowchart of an interlayer video decoding method, according to various embodiments.

In operation 21, the first layer decoder 22 may reconstruct a first layer image based on encoding information acquired from a first layer bitstream.

In operation 23, the second layer decoder 26 may determine a second layer reconstruction block using a first layer reference block corresponding to a second layer block in a first layer reconstruction image according to an inter layer prediction structure.

That is, the second layer decoder 26 may determine a partition mode and a prediction mode of a second layer current block by using the inter layer prediction information acquired from a second layer bitstream and using the first layer reference block corresponding to a current block that is to be reconstructed from a second layer in the first layer reconstruction image.

In operation 25, the luminance compensation determiner 24 may select a luminance compensation model based on any one of a color component of the second layer current block, information about a type of a picture including the second layer current block, and a prediction mode of a current block and may determine a luminance compensation parameter for the luminance compensation model.

In operation 27, the second layer decoder 26 may compensate for luminance of the first layer reference block by using the determined luminance compensation parameter and may reconstruct the second layer image including the second layer current block. In this regard, information regarding the luminance difference between layers may be acquired from a bitstream. Alternatively, the information regarding the luminance difference between layers may be induced by utilizing peripheral pixel values of the second layer current block and peripheral pixel values of the first layer reconstruction block corresponding to the current block. Alternatively, a luminance value of the first layer block may be compensated for by as much as a preset luminance.

Operation 25 will now be described in more detail. The luminance compensation determiner 24 may acquire partition mode information and prediction mode information of a second layer block from a second layer bitstream. The luminance compensation determiner 24 may select a luminance compensation model for the first layer block from the second layer bitstream and may determine a luminance compensation parameter. For example, the prediction mode information of the second layer block may be determined by a merge mode or advanced motion vector prediction (AMVP) mode.

The interlayer video decoding apparatus 20 according to various embodiments may include a central processor (not shown) that generally controls the first layer decoder 22, the luminance compensation determiner 24, and the second layer decoder 26. Alternatively, the first layer decoder 22, the luminance compensation determiner 24, and the second layer decoder 26 may operate by their respective processors (not shown), and the interlayer video decoding apparatus 20 may generally operate according to interactions of the processors (not shown). Alternatively, the first layer decoder 22, the luminance compensation determiner 24, and the second layer decoder 26 may be controlled according to the control of an external processor (not shown) of the interlayer video decoding apparatus 20.

The interlayer video decoding apparatus 20 according to various embodiments may include one or more data storage units (not shown) in which input and output data of the first layer decoder 22, the luminance compensation determiner 24, and the second layer decoder 26 is stored. The interlayer video decoding apparatus 20 may include a memory control unit (not shown) that observes data input and output of the data storage units (not shown).

The interlayer video decoding apparatus 20 according to various embodiments may operate in connection with an internal video decoding processor or an external video decoding processor so as to output video decoding results, thereby performing a video decoding operation including transformation. The internal video decoding processor of the interlayer video decoding apparatus 20 may be implemented by a central processor or a graphic processor as well as a separate processor.

Referring to FIGS. 2A and 2B, the interlayer video decoding apparatus 20 may compensate for a luminance difference between images or views of different layers with respect to a specific type of block or slice during a process of decoding the second layer image, and thus luminance between the first layer reconstruction image and the second layer reconstruction image may be uniform. Referring to FIGS. 1A and 1B, the interlayer video encoding apparatus 10 may perform luminance compensation between images of different layers with respect to a specific type of block or slice, and thus a residual between a prediction image and an original image may be reduced.

Figure 3:
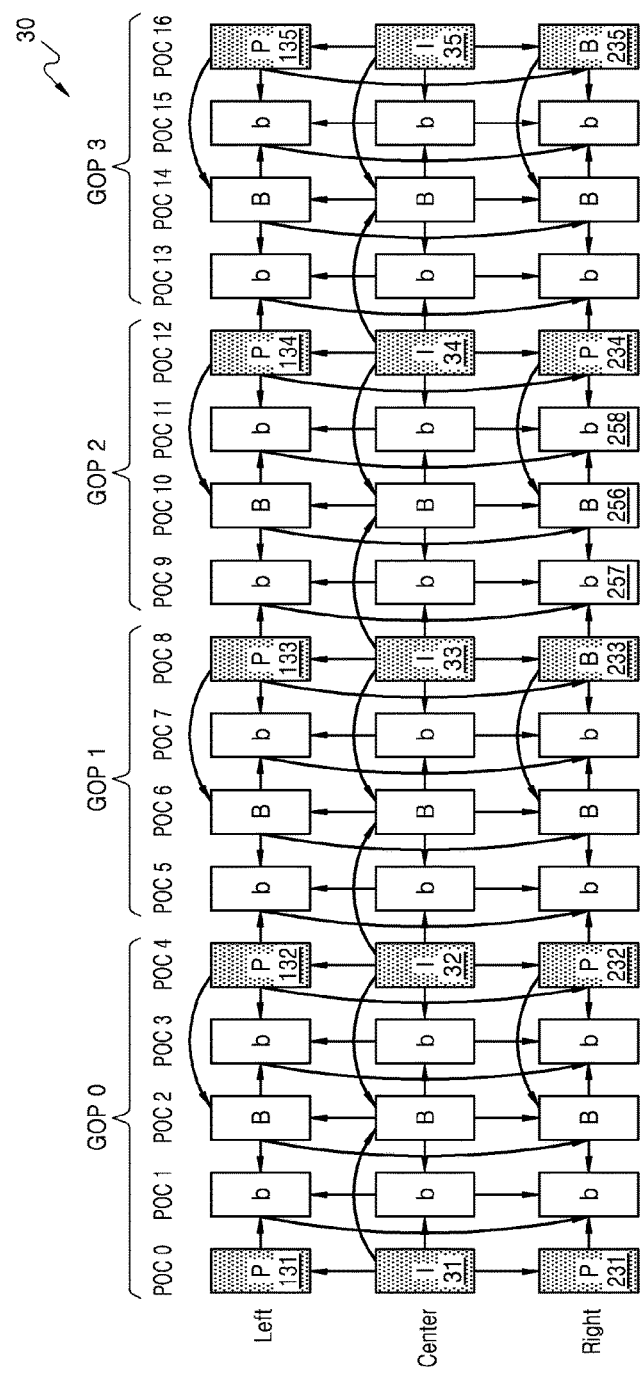
FIG. 3 illustrates an inter-layer prediction structure, according to an embodiment.

FIG. 3 illustrates an inter-layer prediction structure, according to an embodiment.

The inter layer video encoding apparatus 10 according to an embodiment may prediction encode base view images, left view images, and right view images according to a reproduction order 50 of a multi-view video prediction structure shown in FIG. 3.

According to the reproduction order 50 of the multi-view video prediction structure of the related art, images of the same view may be arranged in a horizontal direction. Thus, left view images "Left" may be arranged in a line in the horizontal direction, base view images "Center" may be arranged in a line in the horizontal direction, and right view images "Right" may be arranged in a line in the horizontal direction. The base view images may be center view images compared to the left and right view images.

Images having the same POC order may be arranged in a vertical direction. A POC of images is a reproduction order of images constituting video. "POC X" in the reproduction order 40 of the multi-view video prediction structure indicates a relative reproduction order of images positioned in a corresponding column. The smaller the number of X, the earlier the reproduction order, and the greater the number of X, the later the reproduction order.

Therefore, according to the reproduction order 50 of the multi-view video prediction structure of the related art, the left view images "Left" may be arranged in the horizontal direction according to the POC (reproduction order), the base view images "Center" may be in the horizontal direction according to the POC (reproduction order), and the right view images "Right" may be arranged in the horizontal direction according to the POC (reproduction order). The left and right view images positioned in the same column as that of the base view images have different views but have the same POC (reproduction order).

Four consecutive images of view images constitute a single GOP. Each GOP includes images between consecutive anchor pictures and a single key picture.

An anchor picture is a random access point. In this regard, when a predetermined reproduction position is selected from images that are arranged according to a reproduction order of video, that is, according to a POC, an anchor picture of which a POC is closest to the reproduction position is reproduced. The base view images include base view anchor pictures 51, 52, 53, 54, and 55, the left view images include left view anchor pictures 151, 152, 153, 154, and 155, and the right view images include right view anchor pictures 251, 252, 253, 254, and 255.

Multi-view images may be reproduced and predicted (restored) according to a GOP order. According to the reproduction order 50 of the multi-view video prediction structure, images included in a GOP 0 are reproduced according to views and then images included in a GOP 1 may be reproduced. That is, images included in each GOP may be reproduced in the order of GOP 0, GOP 1, GOP 2, and GOP 3. According to a coding order of the multi-view video prediction structure, the images included in the GOP 0 are predicted (restored) according to views and then the images included in the GOP 1 may be predicted (restored). That is, the images included in each GOP may be reproduced in the order of GOP 0, GOP 1, GOP 2, and GOP 3.

According to the reproduction order 50 of the multi-view video prediction structure, both inter-view prediction (inter layer prediction) and inter prediction may be performed on images. In the multi-view video prediction structure, an image from which an arrow starts, and an image to which an arrow is directed is an image that is predicted by using the reference image.

A predicting result of the base view images may be encoded and then may be output in the form of a base view image stream, and a prediction result of the additional view images may be encoded and then may be output in the form of a layer bitstream. In addition, a predicting result of the left view images may be output in a first layer bitstream and a predicting result of the right view images may be output in a second layer bitstream.

Only inter prediction is performed on base view images. That is, the anchor pictures 41, 42, 43, 44, and 45 that are I-picture type pictures do not refer to different images, whereas the remaining images that are B-picture type images and b-picture type images are predicted with reference to different base view images. The B-picture type images are predicted with reference to an I-picture type anchor picture having a preceding POC order and an I-picture type anchor picture having a later POC order. b-picture type images are predicted with reference to an I-picture type anchor picture having a preceding POC order and a B-picture type image having a later POC order or a B-picture type image having a preceding POC order and an I-picture type anchor picture having a later POC order.

Inter-view prediction (inter layer prediction) referring to different view images and inter prediction referring to the same view images are respectively performed on the left view images and the right view images.

Inter-view prediction (inter layer prediction) may be performed on the left view anchor pictures 151, 152, 153, 154, and 155, respectively, with reference to the base view anchor pictures 51, 52, 53, 54, and 55 having the same POC order. Inter-view prediction may be performed on the right view anchor pictures 251, 252, 253, 254, and 255, respectively, with reference to the base view anchor pictures 51, 52, 53, 54, and 55 or the left view anchor pictures 151, 152, 153, 154, and 155 having the same POC order. Inter-view prediction (inter layer prediction) referring to different view images having the same POC order may be performed on remaining merge images among the left view images and the right view images, other than the anchor pictures 151, 152, 153, 154, 155, 251, 252, 253, 254, and 255.

The remaining merge images among the left view images and the right view images, other than the anchor pictures 151, 152, 153, 154, 155, 251, 252, 253, 254, and 255 are predicted with reference to the same view images.

However, the left view images and the right view images may not be predicted with reference to an anchor picture having a previous reproduction order among additional view images of the same view. That is, for inter prediction of a current left view image, the left view images except for a left view anchor picture having a reproduction order previous to that of the current left view image may be referred to. Likewise, for inter prediction of a current right view image, the right view images except for a right view anchor picture having a reproduction order previous to that of the current right view image may be referred to.

For inter prediction of the current left view image, prediction may be performed by not referring to a left view image that belongs to a GOP previous to a current GPO to which the current left view belongs but by referring to a left view image that belongs to the current GOP and is to be reconstructed before the current left view image. The right view image is the same as described above.

The inter layer video decoding apparatus 20 according to an embodiment may prediction encode base view images, left view images, and right view images according to the reproduction order 50 of a multi-view video prediction structure shown in FIG. 3.

The left view images may be reconstructed via inter-view disparity compensation referring to the base view images and inter-view motion compensation referring to the left view images. The right view images may be reconstructed via inter-view disparity compensation referring to the base view images and the left view images and inter-view motion compensation referring to the right view images. Reference images need to be firstly reconstructed for disparity compensation and motion compensation of the left view images and the right view images.

For inter-view motion compensation of the left view images, the left view images may be reconstructed via inter-view motion compensation referring to reconstructed left view reference images. For inter-view motion compensation of the right view images, the right view images may be reconstructed via inter-view motion compensation referring to reconstructed right view reference images.

For inter-view motion compensation of the current left view image, prediction may be performed by not referring to a left view image that belongs to a GOP previous to a current GPO to which the current left view belongs but by referring to a left view image that belongs to the current GOP and is to be reconstructed before the current left view image. The right view image is the same as described above.

As described above, the interlayer video encoding apparatus 10 and the interlayer video decoding apparatus 20 may adaptively determine the luminance compensation parameter according to image characteristics. Also, the interlayer video encoding apparatus 10 and the interlayer video decoding apparatus 20 may select different luminance compensation models for each slice or block and may determine different luminance compensation parameters for the selected luminance compensation models.

Figure 4:
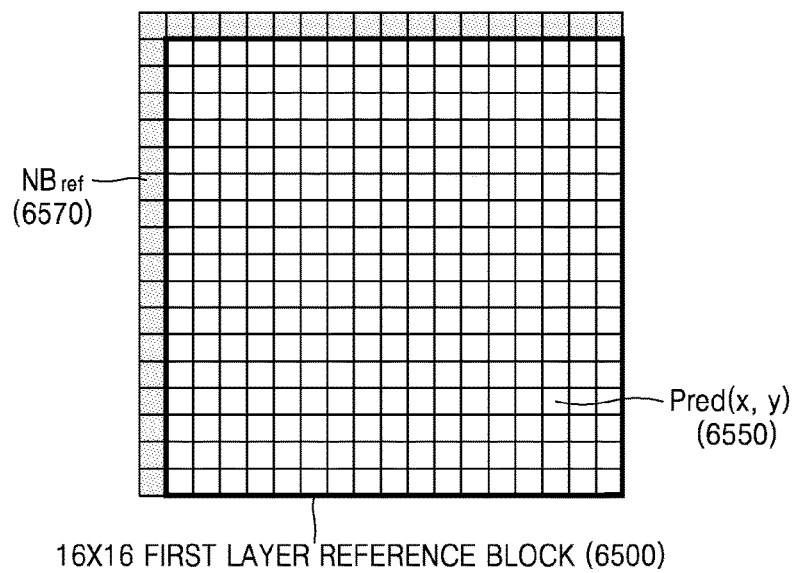
FIG. 4 is a diagram of a method of calculating a luminance compensation parameter by a luminance compensation determiner of an interlayer video decoding apparatus, according to an embodiment.
Figure 4:
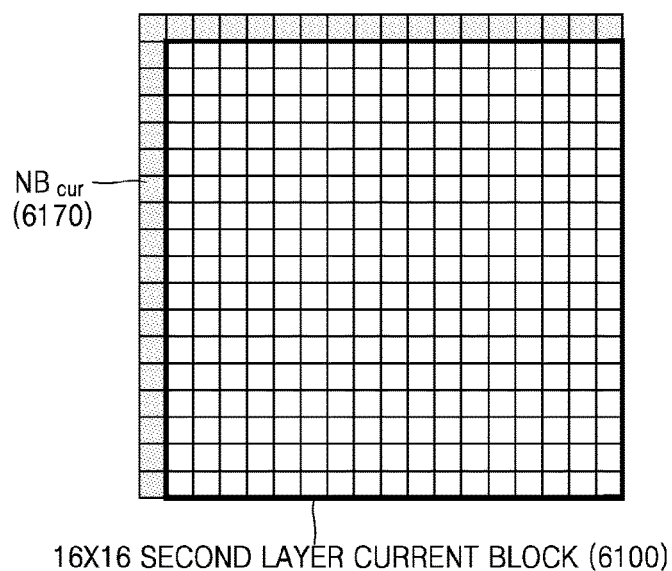

FIG. 4 is a diagram of a method of calculating a luminance compensation parameter by the luminance compensation determiner 24 of the interlayer video decoding apparatus 20, according to an embodiment.

An upper part of FIG. 4 indicates a first layer reference block 6500 in a 16×16 mode, and a lower part of FIG. 4 indicates a second layer current block 6100 in the 16×16 mode. Shaded portions NBref 6570 and NBcur 6170 respectively correspond to peripheral pixels of the first layer reference block 6500 and the second layer current block 6100. As described above, luminance compensation for the first layer reference block 6500 may be performed based on a luminance compensation model that is defined by Equation 1 below by using the first layer reference block 6500 and the second layer current block 6100.

$$\text{Pred}'(x,y) = a \times \text{Pred}(x,y) + b \quad \text{[Equation 1]}$$

The luminance compensation determiner 24 may determine a scale factor (a) and an offset (b). The second layer decoder 26 may perform luminance compensation by determining, as each pixel value (Pred'(x, y)) of the first layer reference block 6500 of which luminance is compensated for, a value that is produced by adding the offset (b) to the scale factor (a) that is multiplied by each pixel value (Pred(x, y) 6550) of the first layer reference block 6500. Hereinafter, the luminance compensation model defined by Equation 1 will be referred to as a first luminance compensation model.

According to an embodiment, the luminance compensation determiner 24 may calculate luminance compensation parameters, that is, a and b, by using all or some of the peripheral pixels NBref 6570 and NBcur 6170 of FIG. 4 because a difference between luminance of pixels within the second layer current block 6100 and luminance of peripheral pixels of the current block. Since a and b may be determined by using the peripheral pixels of the second layer current block 6100 and the first layer reference block 6500, the luminance compensation determiner 24 may calculate the luminance compensation parameters, that is, a and b, even if the luminance compensation parameters are not transmitted to the interlayer video decoding apparatus 20 via a syntax. Therefore, an amount of transmitted data may be reduced.

Examples of a method of calculating the luminance compensation parameters, that is, a and b, may be a linear regression method, an average of difference based prediction (ADP) method, a difference of average based prediction (DAP) method, or the like. If the linear regression method is used, the luminance compensation parameters, that is, a and b, may be calculated based on Equation 2 below.

$$a = \frac{N \cdot \sum_{i=0}^{N-1} NB_{curr}(i) \cdot NB_{ref}(i) - \sum_{i=0}^{N-1} NB_{curr}(i) \cdot \sum_{i=0}^{N-1} NB_{ref}(i)}{N \cdot \sum_{i=0}^{N-1} NB_{ref}(i) \cdot NB_{ref}(i) - \left(\sum_{i=0}^{N-1} NB_{ref}(i)\right)^2}$$

$$b = \frac{\sum_{i=0}^{N-1} NB_{curr}(i) - a \cdot \sum_{i=0}^{N-1} NB_{ref}(i)}{N}$$

[Equation 2]

where, N is the number of peripheral pixels of a block (N is 32 in FIG. 4), NBcur is a peripheral block 6170 of the current block, and NBref is a peripheral block 6570 of a reference block.

Meanwhile, as described above, since a residual between layers is predicted in an interlayer prediction structure, an encoding operation of predicting a luminance difference between layers may increase an amount of arithmetic operations. In detail, an arithmetic operation of multiplying the scale factor (a) and each pixel value requires a large number of clocks of a computer, and thus operation load may occur on the second layer decoder 26 during the luminance compensation.

Therefore, when luminance compensation is performed in consideration of characteristics in a predetermined data unit such as a slice of a current image or a block, the luminance compensation determiner 24 according to an embodiment may perform the luminance compensation by adding the offset only. That is, the luminance compensation only using the offset may be performed by using a luminance compensation model defined by Equation 3.

$$\text{Pred}'(x,y) = \text{Pred}(x,y) + b' \quad \text{[Equation 3]}$$

The luminance compensation determiner 24 may determine an offset (b') only. The second layer decoder 26 may determine, as each pixel value (Pred'(x, y)) of a first layer current block 6100 of which luminance is compensated for, a value that is produced by adding the offset (b') to each value (Pred(x, y)) of a first layer reference block 6550. The luminance compensation model defined by Equation 3 requires only an operation of adding the offset without a multiply operation, and thus, an amount of arithmetic operation necessary to perform the luminance compensation may be reduced.

The luminance compensation determiner 24 may use a formula different from a formula used to calculate the offset (b) of Equation 2 in order to determine the offset (b') in the luminance compensation model defined by Equation 3. Hereinafter, the luminance compensation model defined by Equation 3 will be referred to as a second luminance compensation model.

Meanwhile, although an example in which the luminance compensation models and the parameters forming the luminance compensation models are determined by the interlayer video decoding apparatus 20 is described with reference to FIG. 4, it can be understood by one of ordinary skill in the art that the method described with reference to FIG. 4 may be performed by the interlayer video encoding apparatus 10.

A method of adaptively selecting, by the luminance compensation determiner 24, the first luminance compensation model or the second luminance compensation model will be described below with reference to FIGS. 5A to 5E.

Figure 5A:
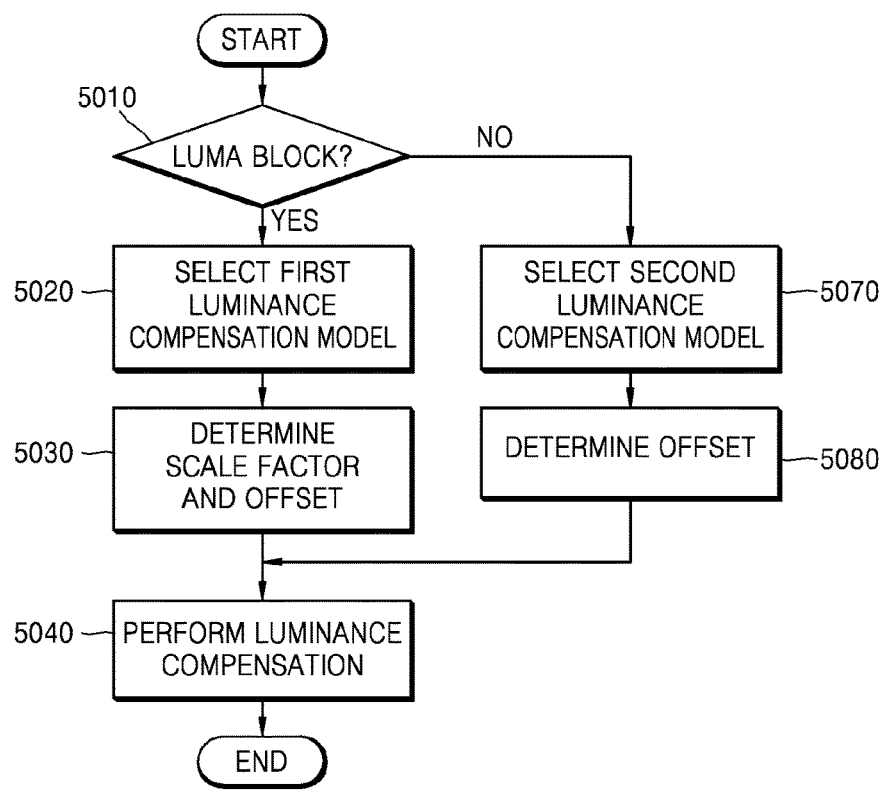
FIG. 5A is a flowchart of an operation of selecting, by a luminance compensation determiner, a luminance compensation model and determining a luminance compensation parameter, according to an embodiment.

FIG. 5A is a flowchart of an operation of selecting, by the luminance compensation determiner 24, a luminance compensation model and determining a luminance compensation parameter, according to an embodiment.

In operation 5010, the luminance compensation determiner 24 of the interlayer video decoding apparatus 20 may determine a color component of a second layer current block for which luminance compensation is to be performed.

In operation 5020, the luminance compensation determiner 24 may select the luminance compensation model defined by Equation 1, that is, the first luminance compensation model using the scale factor (a) and the offset (b), when the color component of the second layer current block is a luma component.

In operation 5030, the luminance compensation determiner 24 may determine the luminance compensation parameters, that is, the scale factor (a) and the offset (b). In operation 5040, the second layer decoder 26 may use the luminance compensation parameters determined by the luminance compensation determiner 24 to determine, as each pixel value (Pred' (x, y)) of the first layer reference block of which luminance is compensated for, a value that is produced by adding the offset (b) to the scale factor (a) that is multiplied by each pixel value (Pred (x, y)) of the first layer reference block and may perform the luminance compensation.

Since people are much more sensitive to brightness of colors than a color difference, luminance compensation for luma components may be performed by using the first luminance compensation model, and luminance compensation for chroma components may be performed by using the second luminance compensation model. Accordingly, in operation 5070, when the color component of the second layer current block is a chroma component, the luminance compensation determiner 24 may select the luminance compensation model defined by Equation 3, that is, the second luminance compensation model using the offset (b') only.

In operation 5080, the luminance compensation determiner 24 may determine the offset (b') that is the luminance compensation parameter. In operation 5040, the second layer decoder 26 may use the luminance compensation parameters determined by the luminance compensation determiner 24 to determine, as each pixel value (Pred' (x, y)) of the first layer reference block of which luminance is compensated for, a value that is produced by adding the offset (b') to each pixel value (Pred (x, y)) of the first layer reference block and may perform the luminance compensation.

The method of FIG. 5A of selecting the luminance compensation model and determining the luminance compensation parameter may be performed according to pseudo codes of Table 1.

TABLE 1

H.8.5.2.2.5.2 Derivation process for illumination compensation parameters
Inputs to this process are:
- a list curSampleList specifying the current samples, ,
- a list refSampleList specifying the reference samples,
- a variable numSamples specifying the number of elements in curSampleList and refSampleList.
- a bit depth of samples, bitDepth.
- the size of the current luma coding block nCSI
- a variable cIdx specifying colour component index,
(when cIdx is 0, it indicates luma, but when cIdx is not 0, it indicates chroma.)
Outputs of this process are:
- a variable icWeight specifying a weight for illumination compensation,
- a variable icOffset specifying a offset for illumination compensation,
- a variable icShift specifying a bit shift for illumination compensation.
The variable icWeight is set equal to 1, the variable icOffset is set equal to 0, and the variable icShift is set equal to 0.
If cIdx is not equal to 0, the following applies:
(The IC model using an offset parameter only is shown below.)
- The variables sumRef, sumCur are set equal to 0 and the following applies for i ranging from 0 to numSamples − 1, inclusive.
  sumRef += refSampleList[ i ]     (H 176)
  sumCur += curSampleList[ i ]     (H 177)
- The variable avgShift and avgOffset specifying the bit shift and offset needed for averaging are derived as
  avgShift = Ceil( Log2( numSamples ) )     (H 186)
  avgOffset = 1 << ( avgShift − 1 )     (H 187)
- The variable icOffset specifying an offset for illumination compensation is derived as:
  icOffset = ( psSumCur − psSumRef + avgOffset ) >> avgShift   (H 202)
Otherwise (if cIdx is equal to 0), the following applies:
(The IC model using both a scale factor and an offset parameter is shown below.)
- The variables sumRef, sumCur, sumRefSquare and sumProdRefCur are set equal to 0 and the following applies for i ranging from 0 to numSamples − 1, inclusive.
  sumRef += refSampleList[ i ]     (H 176)
  sumCur += curSampleList[ i ]     (H 177)
  sumRefSquare += ( refSampleList[ i ] * refSampleList[ i ] ) (H 178)
  sumProdRefCur += ( refSampleList[ i ]* curSampleList[ i ] )    (H 179)
- The variables precShift and precOffset specifying the bit shift and offset needed to restrict precision to 16 bit are derived as
  precShift = Max( 0, bitDepth + Log2( nCSI ) − 14)    (H 180)
  precOffset = 1 << ( precShift − 1)     (H 181)
- The variables psSumRef, psSumCur, psSumRefSquare and psSumProdRefCur are derived as
  psSumRef = ( precShift > 0) ? (sumRef + precOffset) >> precShift: sumRef     (H 182)
  psSumCur = ( precShift > 0) ? (sumCur + precOffset ) >> precShift : sumCur     (H 183)
  psSumRefSquare = ( precShift > 0) ? (sumRefSquare + precOffset ) >> precShift : sumRefSquare (H 184)
  psSumProdRefCur = ( precShift > 0) ? (sumProdRefCur + precOffset ) >> precShift : sumProdRefCur(H 185)
- The variable avgShift and avgOffset specifying the bit shift and offset needed for averaging are derived as
  avgShift = Ceil( Log2( numSamples ) ) − precShift     (H 186)
  avgOffset = 1 << ( avgShift − 1 )     (H 187)
- When avgShift is equal to 0 the whole derivation process specified in this subclause terminates..
- The variables numerDiv and denomDiv specifying numerator and denominator of a following divisions are derived as.
  numerDiv= ( psSumProdRefCur << avgShift ) − psSumRef * psSumCur (H 188)
  denomDiv= ( psSumRefSquare << avgShift ) − psSumRef * psSumRef (H 189)

TABLE 1-continued

Figure 5B:
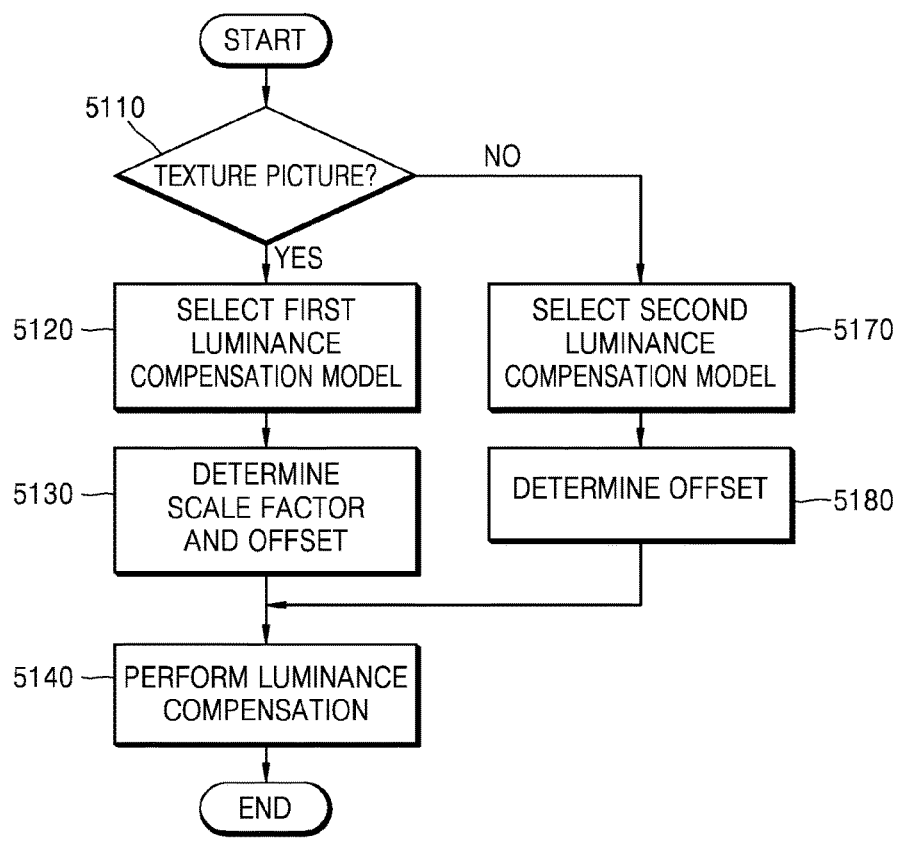
FIG. 5B is a flowchart of an operation of determining, by a luminance compensation determiner, a luminance compensation parameter, according to an embodiment.

- The variables psShiftNumer and psShiftDenom specifying the bit shifts to restrict the precision of numerDiv and denomDiv to 15 bit and 6 bit, respectively are derived as
  psShiftNumer = Max( 0, Floor( Log2( Abs( numerDiv ) ) ) − 14)  (H 190)
  psShiftDenom = Max( 0, Floor( Log2( Abs( denomDiv ) ) ) − 5)  (H 191)
- The variables psNumerDiv and psDenomDiv are derived as
  psNumerDiv = numerDiv >> psShiftNumer     (H 192)
  psDenomDiv = denomDiv >> psShiftDenom    (H 193)
- The variable pslcWeight specifying the shifted weight for illumination compensation is derived as specified in the following.
  - If psDenomDiv is greater than 0, the following applies,
  - The value of variable divCoeff is derived from Table H 11 depending on psDenomDiv.
  - The value of pslcWeight is derived as
    pslcWeight = psNumerDiv * divCoeff (H 194)
  - Otherwise( psDenomDiv is less or equal to 0), pslcWeight is set equal to 0.
- The variable icShift specifying a bit shift for illumination compensation is set equal to 13.
- The variable invPsShift specifying the number of bits needed to shift pslcWeight back to a range of 16 bit precision is derived as
  invPsShift = psShiftDenom − psShiftNumer + 15 − icShift   (H 195)
- The variable invPslcWeight specifying a weight for illumination compensation with 16 bit precision is derived as specified in the following
  - If invPsShift is less than 0, the following applies:
    invPslcWeight = Clip3( pslcWeight << ( Abs( invPsShift ) ), −2^15, 2^15−1)   (H 196)
  Otherwise, ( invPslcWeight is greater than or equal to 0), the following applies:
    invPslcWeight = Clip3( pslcWeight >> ( Abs( invPsShift ) ), −2^15, 2^15 − 1)    (H 197)
- The variable icWeight specifying a weight for illumination compensation with 7 bit precision is derived as specified in the following:
  - If invPslcWeight is greater than or equal to −26 and less than 26, the following applies.
    icWeight = invPslcWeight     (H 198)
  - Otherwise, ( invPslcWeight is less than −26 or greater than or equal to 26 ), the following applies.
    declcShift = Max( 0, Floor(Log2( Abs( icWeight ) ) − 5 ) )   (H 199)
    icWeight = invPslcWeight − declcShift    (H 200)
    icShift −= declcShift     (H 201)
- The variable icOffset specifying an offset for illumination compensation is derived as:
  icOffset = (psSumCur − ((icWeight*psSumRef) >> icShift) + avgOffset) >> avgShift FIG. 5B is a flowchart of an operation of determining, by the luminance compensation determiner 24, a luminance compensation parameter, according to an embodiment.

In operation 5110, the luminance compensation determiner 24 of the interlayer video decoding apparatus 20 may check information about a type of a picture including the second layer current block for which luminance compensation is to be performed and may determine whether the picture corresponds to a texture picture or a depth map picture.

In operation 5120, when the picture including the second layer current block corresponds to the texture picture, the luminance compensation determiner 24 may select the first luminance compensation model, that is, the luminance compensation model using the scale factor (a) and the offset (b).

In operation 5130, the luminance compensation determiner 24 may determine the scale factor (a) and the offset (b') that are the luminance compensation parameters. In operation 5140, the second layer decoder 26 may use the determined luminance compensation parameters to determine, as each pixel value (Pred' (x, y)) of the first layer reference block of which luminance is compensated for, a value that is produced by adding the offset (b) to the scale factor (a) that is multiplied by each pixel value (Pred (x, y)) of the first layer reference block and may perform the luminance compensation.

In operation 5170, when the picture including the second layer current block corresponds to the depth map picture, the luminance compensation determiner 24 may select the second luminance compensation model, that is, the luminance compensation model using the offset (b') only.

In operation 5180, the luminance compensation determiner 24 may determine the offset (b') that is the luminance compensation parameter. In operation 5140, the second layer decoder 26 may use the luminance compensation parameters determined by the luminance compensation determiner 24 to determine, as each pixel value (Pred' (x, y)) of the first layer reference block of which luminance is compensated for, a value that is produced by adding the offset (b) to each pixel value (Pred (x, y)) of the first layer reference block and may perform the luminance compensation.

Figure 5C:
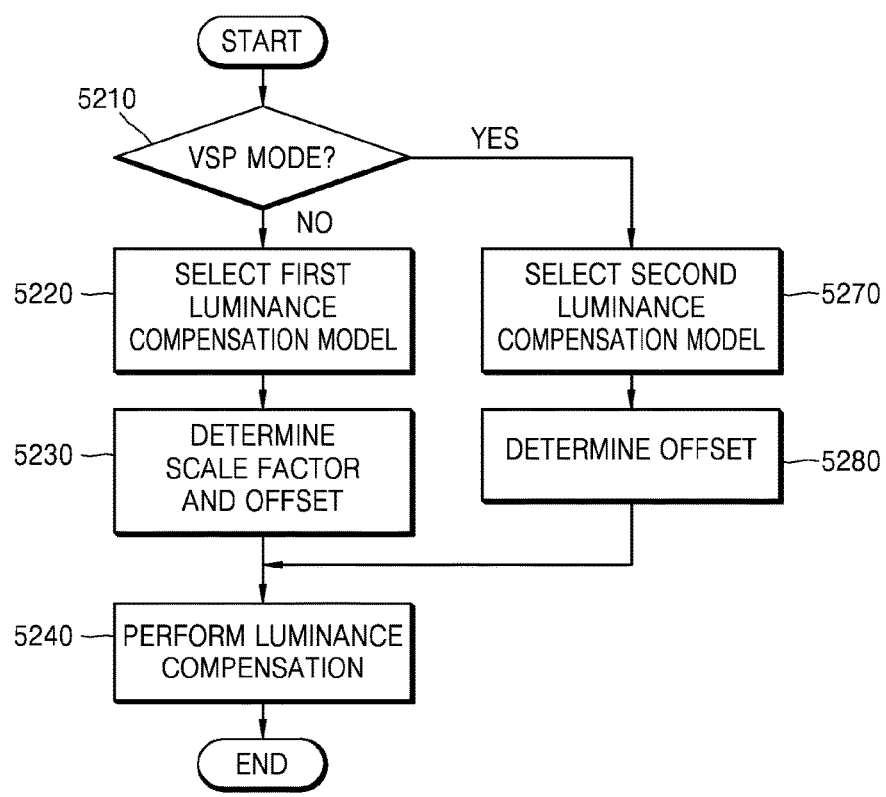
FIG. 5C is a flowchart of an operation of determining, by a luminance compensation determiner, a luminance compensation parameter, according to an embodiment.

FIG. 5C is a flowchart of an operation of determining, by the luminance compensation determiner 24, a luminance compensation parameter, according to an embodiment.

In operation 5120, the luminance compensation determiner 24 of the interlayer video decoding apparatus 20 may determine whether a prediction mode of the second layer current block is a view synthesis prediction mode.

The interlayer video decoding apparatus 20 synthesizes an image having a view to be encoded by using an image having a close view that is reconstructed in the view synthesis prediction mode. That is, a current block to be encoded is split into blocks in a certain unit. Then, disparity information corresponding to each block is induced from a depth map, and thus view compensation may be performed based on the induced disparity information.

In operation 5270, the luminance compensation determiner 24 may select the second luminance compensation model, that is, the luminance compensation model using the offset (b') only, when a mode of the second layer current block, for which luminance compensation is to be performed, is the view synthesis prediction mode.

In operation 5280, the luminance compensation determiner 24 may determine the offset (b') that is the luminance compensation parameter. In operation 5240, the second layer decoder 26 may use the determined luminance compensation parameters to determine, as each pixel value (Pred' (x, y)) of the first layer reference block of which luminance is compensated for, a value that is produced by adding the offset (b') to each pixel value (Pred (x, y)) of the first layer reference block and may perform the luminance compensation.

In operation 5220, the luminance compensation determiner 24 may select the first luminance compensation model, that is, the luminance compensation model using the scale factor (a) and the offset (b), when a mode of the second layer current block, for which luminance compensation is to be performed, is not the view synthesis prediction mode.

In operation 5230, the luminance compensation determiner 24 may determine the scale factor (a) and the offset (b) that are the luminance compensation parameters. In operation 5140, the second layer decoder 26 may use the luminance compensation parameters determined by the luminance compensation determiner 24 to determine, as each pixel value (Pred' (x, y)) of the first layer reference block of which luminance is compensated for, a value that is produced by adding the offset (b) to the scale factor (a) that is multiplied by each pixel value (Pred (x, y)) of the first layer reference block and may perform the luminance compensation.

Figure 5D:
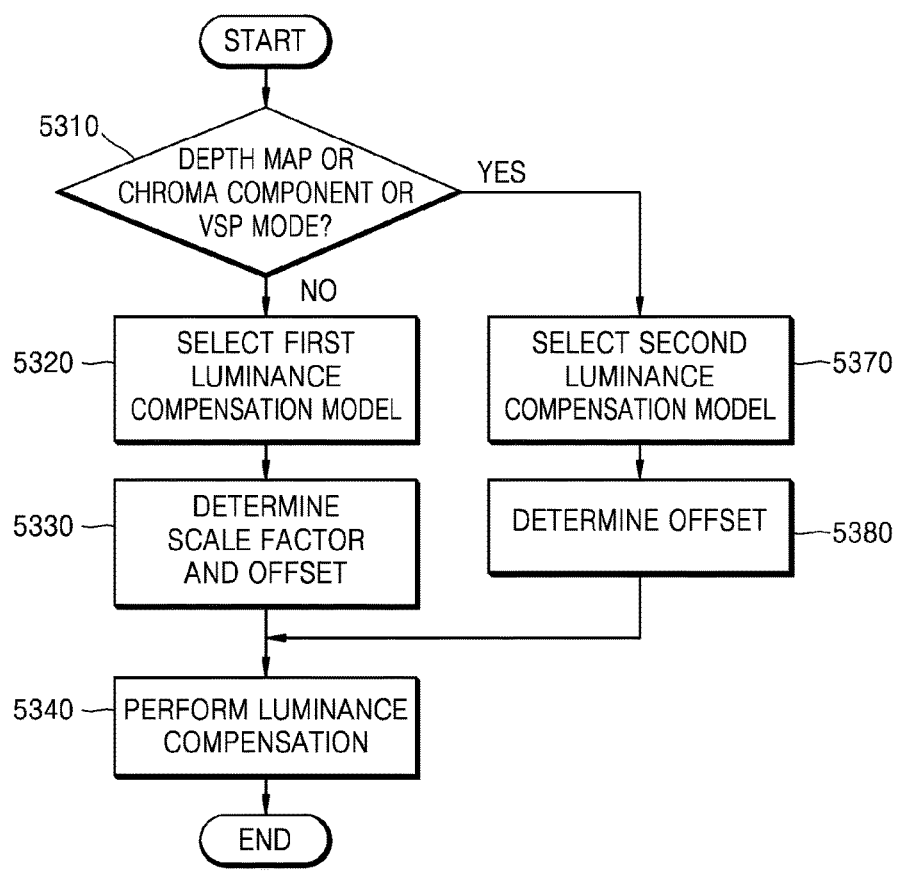
FIG. 5D is a flowchart of an operation of determining, by a luminance compensation determiner, a luminance compensation parameter, according to an embodiment.

FIG. 5D is a flowchart of an operation of determining, by the luminance compensation determiner 24, a luminance compensation parameter, according to an embodiment.

In operation 5310, the luminance compensation determiner 24 of the interlayer video decoding apparatus 20 may determine whether any one of conditions, which are that the color component of the second layer current block for which luminance compensation is to be performed is a chroma component, a picture including the second layer current block is a depth map picture, and a mode of the second layer current block is a view synthesis prediction mode, is satisfied.

When any one of the above conditions is satisfied in operation 5310, the luminance compensation determiner 24 may select the second luminance compensation model, that is, the luminance compensation model using the offset (b') only, in operation 5370. However, when all of the conditions are not satisfied in operation 5310, the luminance compensation determiner 24 may select the first luminance compensation model in operation 5320.

Operations 5330, 5380, and 5340 of FIG. 5D correspond to operations 5230, 5280, and 5240 of FIG. 5C, and thus, detailed descriptions thereof will be omitted.

The method of FIG. 5D of selecting the luminance compensation model and determining the luminance compensation parameter may be performed according to pseudo codes of Table 2.

TABLE 2

H.8.5.2.2.5.2 Derivation process for illumination compensation parameters
Inputs to this process are:
- a list curSampleList specifying the current samples, ,
- a list refSampleList specifying the reference samples,
- a variable numSamples specifying the number of elements in curSampleList and refSampleList.
- a bit depth of samples, bitDepth.
- the size of the current luma coding block nCSI
- a variable cIdx specifying colour component index,
(when cIdx is 0, it indicates luma, and when cIdx is not 0, it indicates chroma.)
- a variable isOffset specifying illumination compensation mode.
(when a block mode is a view synthesis prediction mode, icOffset is set to be 1. When the block mode is not the view synthesis prediction mode, icOffset is set to be 0.)
Outputs of this process are:
- a variable icWeight specifying a weight for illumination compensation,
- a variable icOffset specifying a offset for illumination compensation,
- a variable icShift specifying a bit shift for illumination compensation.
The variable icWeight is set equal to 1, the variable icOffset is set equal to 0, and the variable icShift is set equal to 0.
If DepthFlag is equal to 1, isOffset is equal to 1 or cIdx is not equal to 0, the following applies:
(DepthFlag is set to be 1 when a current picture is a depth map.)
(The IC model using an offset parameter only is shown below.)
- The variables sum Ref, sumCur are set equal to 0 and the following applies for i ranging from 0 to numSamples −1, inclusive.
    sumRef += refSampleList[ i ]    (H 176)
    sumCur += curSampleList[ i ]    (H 177)
- The variable avgShift and avgOffset specifying the bit shift and offset needed for averaging are derived as
    avgShift = Ceil( Log2( numSamples ) )    (H 186)
    avgOffset = 1 << ( avgShift − 1)    (H 187)
- The variable icOffset specifying an offset for illumination compensation is derived as:
    icOffset = ( psSumCur − psSumRef + avgOffset) >> avgShift    (H 202)

TABLE 2-continued

Otherwise (if DepthFlag is equal to 0, isOffset is equal to 0 and cIdx is equal to 0), the following applies:
(The IC model using both a scale factor and an offset parameter only is shown below.)
- The variables sumRef, sumCur, sumRefSquare and sumProdRefCur are set equal to 0 and the following applies for i ranging from 0 to numSamples − 1, inclusive.
    sumRef += refSampleList[ i ]   (H 176)
    sumCur += curSampleList[ i ]   (H 177)
    sumRefSquare += ( refSampleList[ i ]* refSampleList[ i ] ) (H 178)
    sumProdRefCur += ( refSampleList[ i ]* curSampleList[ i ] )   (H 179)
- The variables precShift and precOffset specifying the bit shift and offset needed to restrict precision to 16 bit are derived as
    precShift = Max( 0, bitDepth + Log2( nCSI ) − 14)   (H 180)
    precOffset = 1 << ( precShift − 1)   (H 181)
- The variables psSumRef, psSumCur, psSumRefSquare and psSumProdRefCur are derived as
    psSumRef = ( precShift > 0) ? (sumRef + precOffset) >> precShift: sumRef (H 182)
    psSumCur = ( precShift > 0) ? (sumCur + precOffset ) >> precShift : sumCur (H 183)
    psSumRefSquare = ( precShift > 0) ? (sumRefSquare + precOffset ) >> precShift : sumRefSquare (H 184)
    psSumProdRefCur = ( precShift > 0) ? (sumProdRefCur + precOffset ) >> precShift : sumProdRefCur(H 185)
- The variable avgShift and avgOffset specifying the bit shift and offset needed for averaging are derived as
    avgShift = Ceil( Log2( numSamples ) ) − precShift   (H 186)
    avgOffset = 1 << ( avgShift − 1)   (H 187)
- When avgShift is equal to 0 the whole derivation process specified in this subclause terminates..
- The variables numerDiv and denomDiv specifying numerator and denominator of a following divisions are derived as.
    numerDiv= ( psSumProdRefCur << avgShift ) − psSumRef * psSumCur (H 188)
    denomDiv= ( psSumRefSquare << avgShift ) − psSumRef * psSumRef (H 189)
- The variables psShiftNumer and psShiftDenom specifying the bit shifts to restrict the precision of numerDiv and denomDiv to 15 bit and 6 bit, respectively are derived as
    psShiftNumer = Max( 0, Floor( Log2( Abs( numerDiv ) ) ) − 14)   (H 190)
    psShiftDenom = Max( 0, Floor( Log2( Abs( denomDiv ) ) ) − 5)   (H 191)
- The variables psNumerDiv and psDenomDiv are derived as
    psNumerDiv = numerDiv >> psShiftNumer   (H 192)
    psDenomDiv = denomDiv >> psShiftDenom   (H 193)
- The variable pslcWeight specifying the shifted weight for illumination compensation is derived as specified in the following.
   - If psDenomDiv is greater than 0, the following applies,
    - The value of variable divCoeff is derived from Table H 11 depending on psDenomDiv.
    - The value of pslcWeight is derived as
     pslcWeight = psNumerDiv * divCoeff (H 194)
   - Otherwise( psDenomDiv is less or equal to 0), pslcWeight is set equal to 0.
- The variable icShift specifying a bit shift for illumination compensation is set equal to 13.
- The variable invPsShift specifying the number of bits needed to shift pslcWeight back to a range of 16 bit precision is derived as
    invPsShift = psShiftDenom − psShiftNumer + 15 − icShift (H 195)
- The variable invPslcWeight specifying a weight for illumination compensation with 16 bit precision is derived as specified in the following
   - If invPsShift is less than 0, the following applies:
    invPslcWeight = Clip3( pslcWeight << ( Abs( invPsShift ) ), −2^15, 2^15 − 1)   (H 196)
   - Otherwise, ( invPsShift is greater than or equal to 0), the following applies:
    invPslcWeight = Clip3( pslcWeight >> ( Abs( invPsShift ) ), −2^15, 2^15 − 1)   (H 197)
- The variable icWeight specifying a weight for illumination compensation with 7 bit precision is derived as specified in the following:
   - If invPslcWeight is greater than or equal to −2^6 and less than 2^6, the following applies.
    icWeight = invPslcWeight   (H 198)
   - Otherwise, ( invPslcWeight is less than −2^6 or greater than or equal to 2^6 ), the following applies.
    declcShift = Max( 0, Floor(Log2( Abs( icWeight ) ) − 5 ) )   (H 199)
    icWeight = invPslcWeight >> declcShift   (H 200)
    icShift −= declcShift   (H 201)

TABLE 2-continued

- The variable icOffset specifying an offset for illumination compensation is derived as:
    icOffset = ( psSumCur − ( ( icWeight*psSumRef ) >> icShift ) + avgOffset ) >> avgShift   (H 202)

Figure 5E:
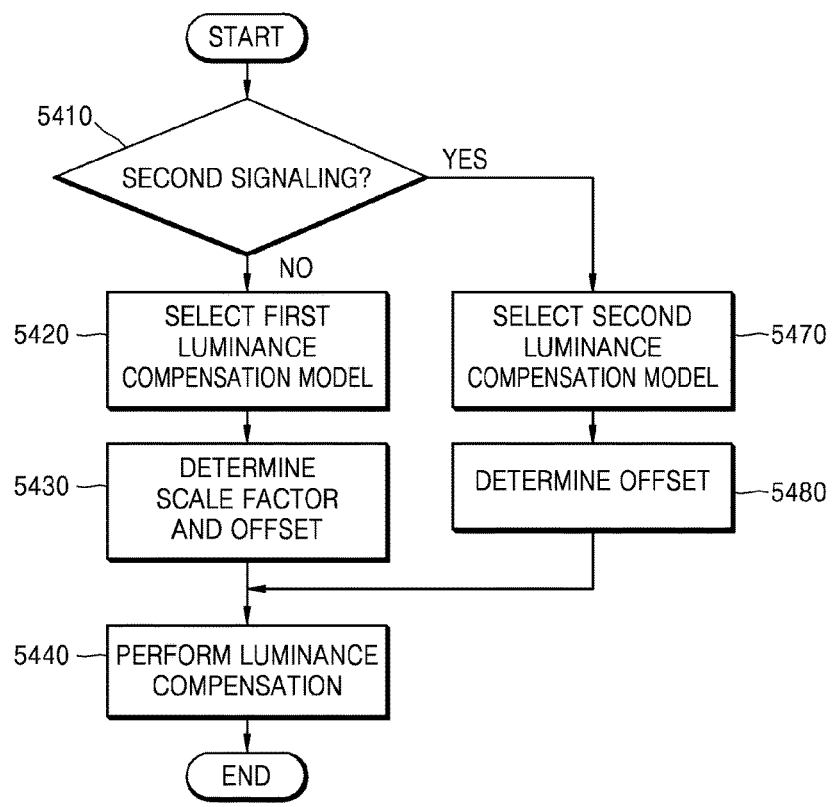
FIG. 5E is a flowchart of an operation of determining, by a luminance compensation determiner, a luminance compensation parameter, according to an embodiment.

FIG. 5E is a flowchart of an operation of determining, by the luminance compensation determiner 24, a luminance compensation parameter, according to an embodiment.

In general, since an illumination change locally occurs in a frame, it is not necessary to use the same luminance compensation model for all areas of an image, in other words, for all blocks in the image. Encoding efficiency may degrade when luminance compensation is performed for some of the blocks, and thus, it is required to adaptively perform the luminance compensation in a block unit.

Therefore, a determination as to whether luminance compensation is performed for each block or whether the first luminance compensation model, that is, the luminance compensation using the scale factor (a) and the offset (b), or the second luminance compensation model, that is, the luminance compensation model using the offset (b'), is selected during the luminance compensation may be made, and the luminance compensation may be performed after the determination is clearly made through signaling.

For example, the interlayer video decoding apparatus 20 may determine whether to perform luminance compensation or select a luminance compensation model and may transmit a flag together with signaling bits in a macro-block unit to the luminance compensation determiner 24. That is, in operation 5410, the luminance compensation determiner 24 does not perform the luminance compensation when the transmitted flag is 0. When the transmitted flag is 1, the luminance compensation determiner 24 may select the first luminance compensation model (operation 5420) and determine the scale factor (a) and the offset (b) (operation 5430). When the transmitted flag is 2, the luminance compensation determiner 24 may select the second luminance compensation model (operation 5470) and determine the offset (b') (operation 5480). Operation 5440 corresponds to operation 5240 of FIG. 5C, and thus detailed descriptions thereof will be omitted.

The interlayer video decoding apparatus 20 may perform signaling according to a color component or a prediction mode of a block for which luminance compensation is to be performed. For example, signaling may be respectively performed for a luminance compensation model that is appropriate for a luma component and for a luminance compensation model that is appropriate for a chroma component. Alternatively, signaling is performed for the luminance compensation model that is appropriate for the luma component, and the chroma component always uses the same luminance compensation model as the luminance compensation model used by the luma component.

As another example, the interlayer video encoding apparatus 10 may perform signaling to use the second luminance compensation model using only the offset (b') when the prediction mode of the second layer current block is the view synthesis prediction mode and to selectively use the luminance compensation models in modes, other than the view synthesis prediction mode.

According to an embodiment, based on the values of the peripheral blocks of the second layer current block and the first layer reference block, the luminance compensation determiner 24 determines the scale factor (a) and the offset (b) used in Equation 1 and the offset (b') used in Equation 3 through methods such as a linear regression method, an ADP method or a DAP method.

An example in which the interlayer video decoding apparatus 20 selects the luminance compensation model and determines the luminance compensation parameter has been described with reference to FIGS. 5A to 5E, but it may be understood by one of ordinary skill in the art that the interlayer video encoding apparatus 10 may also select the luminance compensation model and determine the luminance compensation parameter.

Figure 6:
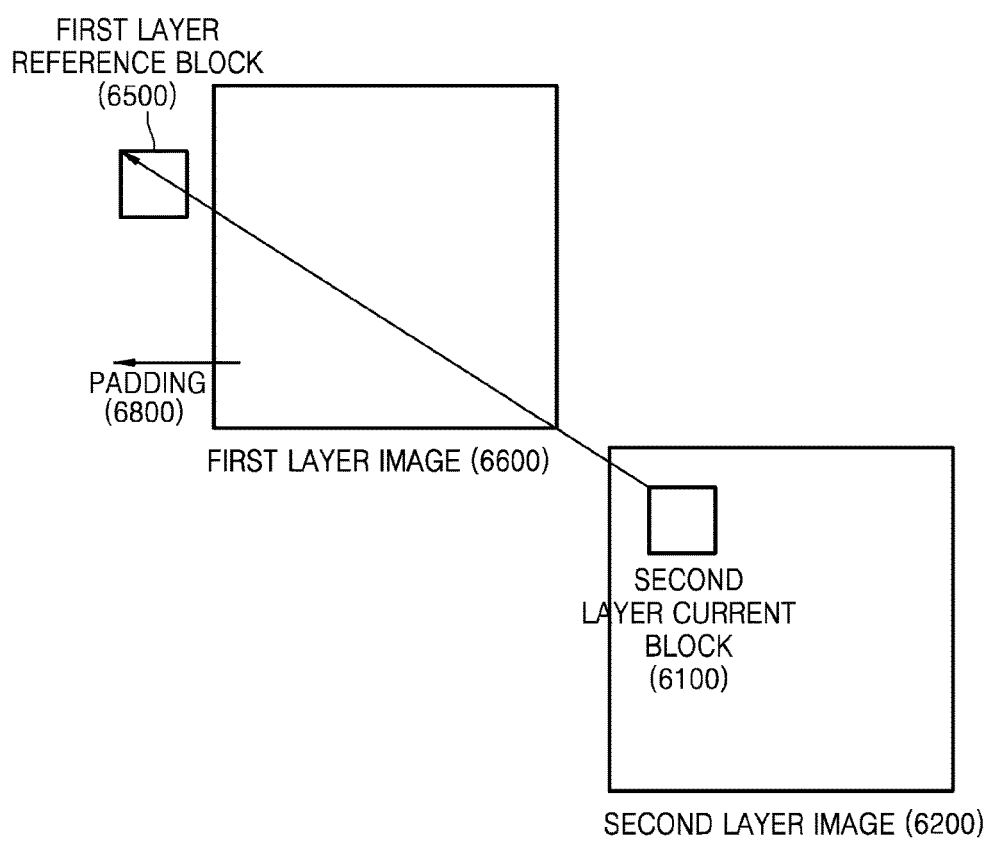
FIG. 6 is a diagram for describing a method of determining a luminance compensation parameter according to an embodiment.

FIG. 6 is a diagram for describing a method of determining a luminance compensation parameter according to an embodiment.

As described above, the luminance compensation determiner 24 of the second layer decoder 26 determines luminance compensation parameters by using some or all of the peripheral blocks NBref 6570 and NBcur 6170 of the first layer reference block 6500 and the second layer current block 6100 and performs luminance compensation by using the first layer reference block 6500, the second layer current block 6100, and the determined luminance compensation parameters. When the first layer reference block 6500 is located outside a boundary of a first layer reconstruction image 6600, the first layer reference block 6500 may not be used as a reference block and may not be used to calculate a luminance compensation parameter.

In more detail, the second layer current block 6100 may predict a disparity vector from a peripheral block, and when a block indicated by the predicted disparity vector of the second layer current block 6100, that is, when the first layer reference block 6500 is located outside the boundary of the first layer reconstruction image 6600, the first layer reference block 6500 and peripheral pixels thereof may not be used so that the first layer reference block 6500 may not be used and the luminance compensation parameter may not be calculated.

When the first layer reference block 6500 is located outside the boundary of the first layer reconstruction image 6600, the luminance compensation determiner 14 of the interlayer video encoding apparatus 10 may replace a region outside the boundary and peripheral pixels around the region with pixels located within the boundary of the first layer reconstruction image 6600. According to an embodiment, the luminance compensation determiner 14 uses values of pixels located on the boundary of the first layer reconstruction image 6600 to replace a section from the boundary of the first layer reconstruction image 6600 to a region of the first layer reference block 6500 outside the boundary with the pixels and may pad the section with the pixels located on the boundary of the first layer reconstruction image 6600.

As a value of the boundary of the first layer reconstruction image 6600 is assigned to the region outside the boundary of the first layer reference block 6500, a reference block may be used even though the reference block is located outside a reference image. Thus, a luminance compensation parameter may be induced, and coding efficiency may be improved.

The method of FIG. 6 of determining the luminance compensation parameter may be performed according to pseudo code of Table 3.

TABLE 3

I.8.5.3.3.6.1 Derivation process for illumination compensation mode availability and parameters
...
3. .If pulvPredFlagLX is equal to 0, the variable pulcFlagLX is set equal to 0, otherwise (pulvPredFlagLX is equal to 1 ) the following applies:
- The luma location (xRLX, yRLX) specifying the top-left sample of the reference block in refPicLX is derived as
xRLX = xC + ( ( mvLX[ 0 ] + ( cIdx ? 4 : 2 ) ) >> ( 2 + ( cIdx ? 1 : 0 ) ) ) (I 198)
yRLY = yC + ( ( mvLX[ 1 ] + ( cIdx ? 4 : 2 ) ) >> ( 2 + ( cIdx ? 1 : 0 ) ) ) (I 199)
- The variable availFlagAboveRowLX specifying whether the above neighbouring row samples of the current block and the reference block are available is derived as specified in the following:
availFlagAboveRowLX = availFlagCurAboveRow (I 200)
- The variable availFlagLeftColLX specifying whether the left neighbouring column samples of the current block and the reference block are available is derived as specified in the following:
availFlagLeftColLX = availFlagCurLeftCol (I 201)
- The variable pulcFlagLX is derived as follows:
pulcFlagLX = availFlagAboveRowLX || availFlagLeftColLX    (I 202)
...
2.   The lists curNeighSampleListLX and refNeighSampleListLX specifying the neighbouring samples in the current picture and the reference picture are derived as specified in the following:
- The variable numNeighSamplesLX specifying the number of elements in curNeighSampleListLX and in refNeighSampleLX is set equal to 0.
- The variable leftNeighOffLX specifying the offset of the left neighbouring samples in curNeighSampleListLX and refNeighSampleLX is derived as
leftNeighOffLX = availFlagAboveRowLX ? 0 : nCS (I 204)
- For i ranging from 0 to nCS - 1, inclusive the following applies:
- When availFlagAboveRowLX is equal to 1 the following applies:
xP = Clip3( 0, pic_width_in_luma_samples - 1, xRLX + i )
yP = Clip3( 0, pic_height_in_luma_samples - 1, yRLY - 1 )
curNeighSampleListLX[ i ] = curRecSamples[ xC + i ][ yC - 1 ] (I 205)
ref NeighSampleListLX[ I ] = ref RecSamples[ xP ][ yP ] (I 206)
numNeighSamplesLX += 1      (I 207)
- When availFlagLeftColLX is equal to 1 the following applies:
xP = Clip3( 0, pic_width_in_luma_samples - 1, xRLX - 1 )
yP = Clip3( 0, pic_height_in_luma_samples - 1, yRLY + i)
curNeighSampleListLX[ i + leftNeighOffLX ] = curRecSamples[ xC - 1][ yC + i ]    (I208)
ref NeighSampleListLX[ i + leftNeighOffLX ] = ref RecSamples[ xP][ yP ] (I 209)
numNeighSamplesLX += 1       (I 210)
...

The interlayer video encoding apparatus 10 and the interlayer video decoding apparatus 20 for adaptively selecting luminance compensation models for blocks according to image characteristics and determining luminance compensation parameters for the selected luminance compensation models have been suggested with reference to FIGS. 1A to 6.

If the luminance compensation is performed by using the luminance compensation model defined by Equation 1, an amount of arithmetic operations may increase. Thus, the luminance compensation is performed by using the luminance compensation model defined by Equation 1 on some blocks that satisfy certain conditions, and the luminance compensation is performed by using the luminance compensation model defined by Equation 3 on blocks that do not satisfy certain conditions.

In the interlayer video encoding apparatus 10 according to an embodiment and the interlayer video decoding apparatus 20 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units having a tree structure according to an embodiment will be described with reference to FIGS. 8 through 19.

In principle, during encoding/decoding for multi-layer video, encoding/decoding processes for first layer images and encoding/decoding processes for second layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit according to a tree structure, which will be described with reference to FIGS. 7 through 19, are performed on a single-layer video, only inter prediction and motion compensation will be described. However, as described with reference to FIGS. 1A through 6, inter-layer prediction and compensation between base layer images and second layer images are performed to encode/decode a video stream.

Figure 7:
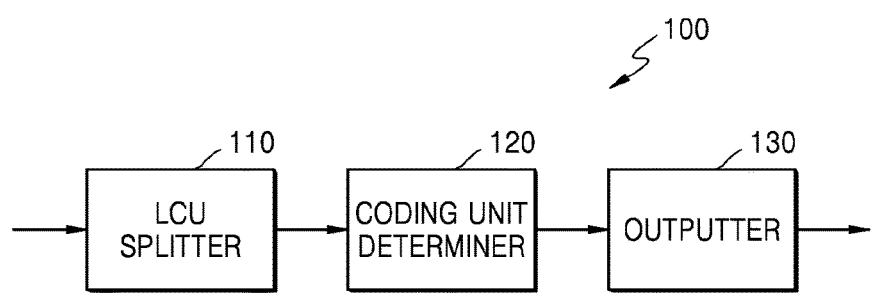
FIG. 7 is a block diagram of a video encoding apparatus based on coding units according to a tree structure, according to an embodiment.

Thus, when the first layer encoder 12 of the interlayer video encoding apparatus 10 according to an embodiment encodes a multi-layer video based on a coding unit according to a tree structure, in order to encode a video for each respective single-view video, the interlayer video encoding apparatus 10 includes as many video encoding apparatuses 100 of FIG. 7 as the number of layers of the multi-layer video in order to encode a video such that each video encoding apparatus 100 may be controlled to encode an assigned single-layer video. In addition, the interlayer video encoding apparatus 10 may perform inter-view prediction by using the encoding results of separate single-views of each video encoding apparatus 100. Thus, the first layer encoder 12 of the interlayer video encoding apparatus 10 may generate a base layer video stream and a second layer video stream, in which the encoding results for respective layers are recorded, for each respective hierarchy.

Figure 8:
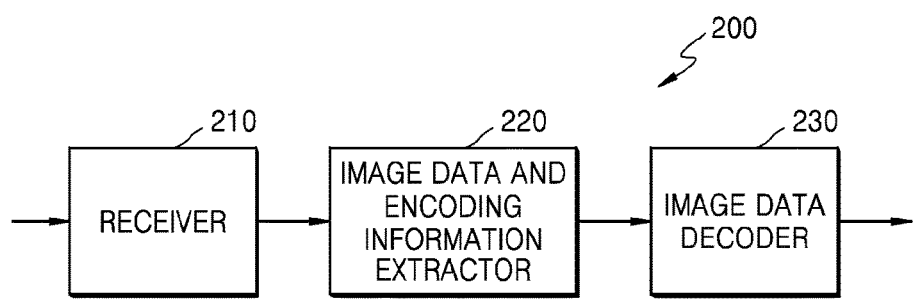
FIG. 8 is a block diagram of a video decoding apparatus based on coding units according to a tree structure, according to various embodiments.

Similarly, when the second layer encoder 26 of the interlayer video decoding apparatus 20 according to an embodiment decodes a multi-layer video based on a coding unit according to a tree structure, in order to decode the received base layer video stream and second layer video stream for each respective layer, the interlayer video decoding apparatus 20 may include as many video decoding apparatuses 200 of FIG. 8 as the number of layers of the multi-view video and the video decoding apparatuses 200 may be controlled to perform decoding on single-layer videos that are respectively assigned to the video decoding apparatuses 200. In addition, the interlayer video encoding apparatus 10 may perform inter-view compensation by using the decoding result of separate single-layer of each video decoding apparatuses 200. Thus, the second layer encoder 26 of the interlayer video decoding apparatus 20 may generate first layer images and second layer images, which are restored for respective layers.

FIG. 7 is a block diagram of the video encoding apparatus 100 based on coding units according to a tree structure, according to one or more embodiments.

The video encoding apparatus 100 involving video prediction based on coding units according to a tree structure includes a LCU splitter 110, a coding unit determiner 120, and an outputter 130.

The LCU splitter 110 may split a current picture based on a LCU that is a coding unit having a maximum size for a current picture of an image. If the current picture is larger than the LCU, image data of the current picture may be split into the at least one LCU. The LCU according to one or more embodiments may be a data unit having a size of 32×32, 64×64, 128×128, 256×256, etc., wherein a shape of the data unit is a square having a width and length in squares of 2. The image data may be output to the coding unit determiner 120 according to the at least one LCU.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a depth by encoding the image data in the deeper coding units according to depths, according to the LCU of the current picture, and selecting a depth having the least encoding error. The determined depth and the encoded image data according to the determined depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 120 may determine coding units having a tree structure included in the LCU. The 'coding units having a tree structure' according to one or more embodiments include coding units corresponding to a depth determined to be the depth, from among all deeper coding units included in the LCU. A coding unit of a depth may be hierarchically determined according to depths in the same region of the LCU, and may be independently determined in different regions. Similarly, a depth in a current region may be independently determined from a depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a depth requires not only information about the depth, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a LCU and methods of determining a prediction unit/partition, and a transformation unit, according to one or more embodiments, will be described in detail below with reference to FIGS. 9 through 19.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one depth determined by the coding unit determiner 120, and information about the encoding mode according to the depth, in bitstreams.

The encoded image data may be obtained by encoding residues of an image.

The information about the encoding mode according to depth may include information about the depth, about the partition mode in the prediction unit, the prediction mode, and the size of the transformation unit.

The information about the depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a depth, information about at least one encoding mode may be determined for one LCU. Also, a depth of the image data of the LCU may be different according to locations since the image data is hierarchically split according to depths, and thus splitting information may be set for the image data.

Accordingly, the outputter 130 may assign corresponding splitting information to at least one of the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output SAO parameters related to the SAO operation described above with reference to FIGS. 1A through 14.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The interlayer video encoding apparatus 10 described with reference to FIG. 1A may include as many video encoding apparatuses 100 as the number of layers in order to encode single-layer images for respective layers of a multi-layer video. For example, the first layer encoder 12 may include a single video encoding apparatus 100 and the disparity vector determiner 14 may include as many video encoding apparatuses 100 as the number of additional views.

When the video encoding apparatus 100 encodes first layer images, the coding determiner 120 may determine a prediction unit for inter prediction for each respective coding unit according to a tree structure for each largest coding unit and may perform inter prediction for each respective prediction unit.

When the video encoding apparatus 100 encodes second layer images, the coding determiner 120 may also determine a prediction unit and a coding unit according to a tree structure for each largest coding unit and may perform inter prediction for each respective prediction unit.

The video encoding apparatus 100 may encode a brightness difference between first and second layer images for compensating for the brightness difference.

FIG. 8 is a block diagram of the video decoding apparatus 200 based on coding units having a tree structure, according to one or more embodiments.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts splitting information and encoding information for the coding units having a tree structure according to each LCU, from the parsed bitstream. The extracted splitting information and encoding information are output to the image data decoder 230. In other words, the image data in a bit stream is split into the LCU so that the image data decoder 230 decodes the image data for each LCU.

The splitting information and encoding information according to the LCU may be set for at least one piece of splitting information corresponding to the depth, and encoding information according to the depth may include information about a partition mode of a corresponding coding unit corresponding to the depth, information about a prediction mode, and splitting information of a transformation unit. Also, splitting information according to depths may be extracted as the information about a final depth.

The splitting information and the encoding information according to each LCU extracted by the image data and encoding information extractor 220 is splitting information and encoding information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a depth and an encoding mode that generates the minimum encoding error.

Since the splitting information and the encoding information may be assigned to a predetermined data unit from among a corresponding coding unit, a prediction unit, and a minimum unit, the image data and encoding information extractor 220 may extract the splitting information and the encoding information according to the predetermined data units. If splitting information and encoding information of a corresponding LCU are recorded according to predetermined data units, the predetermined data units to which the same splitting information and encoding information are assigned may be inferred to be the data units included in the same LCU.

The image data decoder 230 reconstructs the current picture by decoding the image data in each LCU based on the splitting information and the encoding information according to the LCUs. In other words, the image data decoder 230 may decode the encoded image data based on the extracted information about the partition mode, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a final depth of a current LCU by using splitting information according to depths. If the splitting information indicates that image data is no longer split in the current depth, the current depth is the final depth. Accordingly, the image data decoder 230 may decode encoded data in the current LCU by using the information about the partition mode of the prediction unit, the information about the prediction mode, and the splitting information of the transformation unit for each coding unit corresponding to the depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The interlayer video decoding apparatus 20 described with reference to FIG. 2A may include as many video decoding apparatuses 200 as the number of views in order to decode the received first layer image stream and second layer image stream to restore first layer images and second layer images.

When a first layer image stream is received, the image data decoder 230 of the video decoding apparatus 200 may split samples of first layer images that are extracted from the first layer image stream by the extractor 220 into coding units according to a tree structure of a largest coding unit. The image data decoder 230 may perform motion compensation on respective prediction units for inter prediction for each respective coding unit according to a tree structure of the samples of the first layer images, to restore the first layer images.

When a second layer image stream is received, the image data decoder 230 of the video decoding apparatus 200 may split samples of second layer images that are extracted from the second layer image stream by the extractor 220 into coding units according to a tree structure of a largest coding unit. The image data decoder 230 may perform motion compensation on respective prediction units for inter prediction of the samples of the second layer images to restore the second layer images.

The extractor 220 may obtain information relating to a brightness order between first and second layer images from a bitstream in order to compensate for the brightness difference. However, according to image characteristics, an amount of arithmetic operations may be reduced by adaptively selecting a luminance compensation model.

The video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 9:
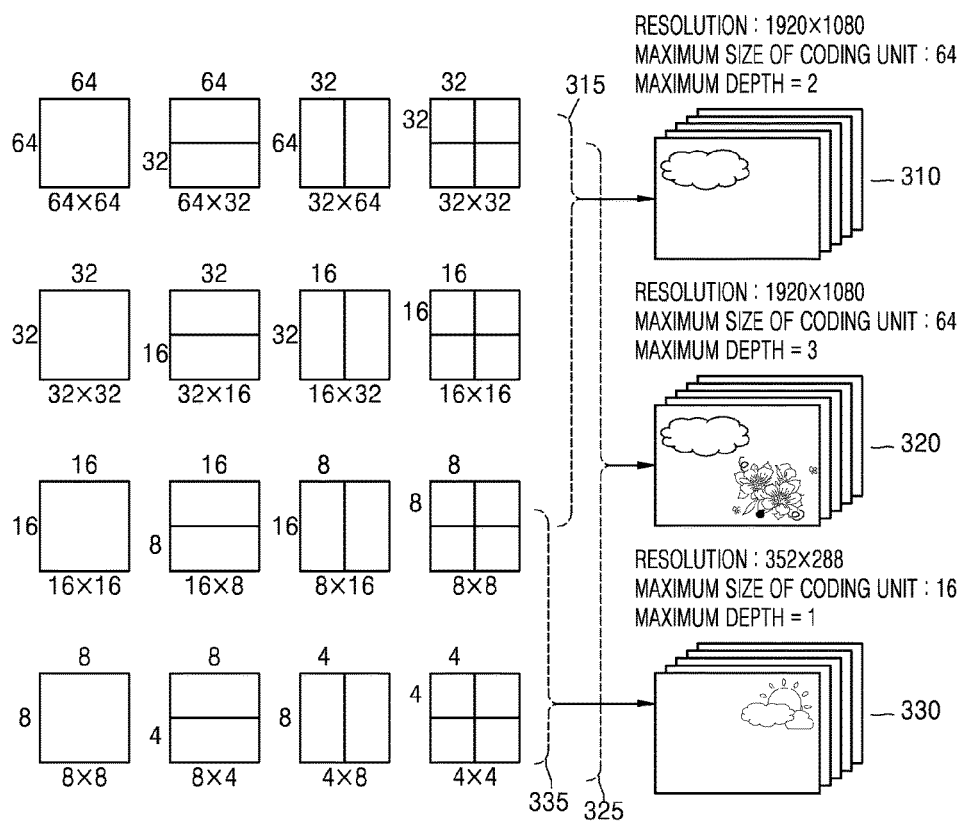
FIG. 9 is a diagram for describing a concept of coding units according to an embodiment.

FIG. 9 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 10:
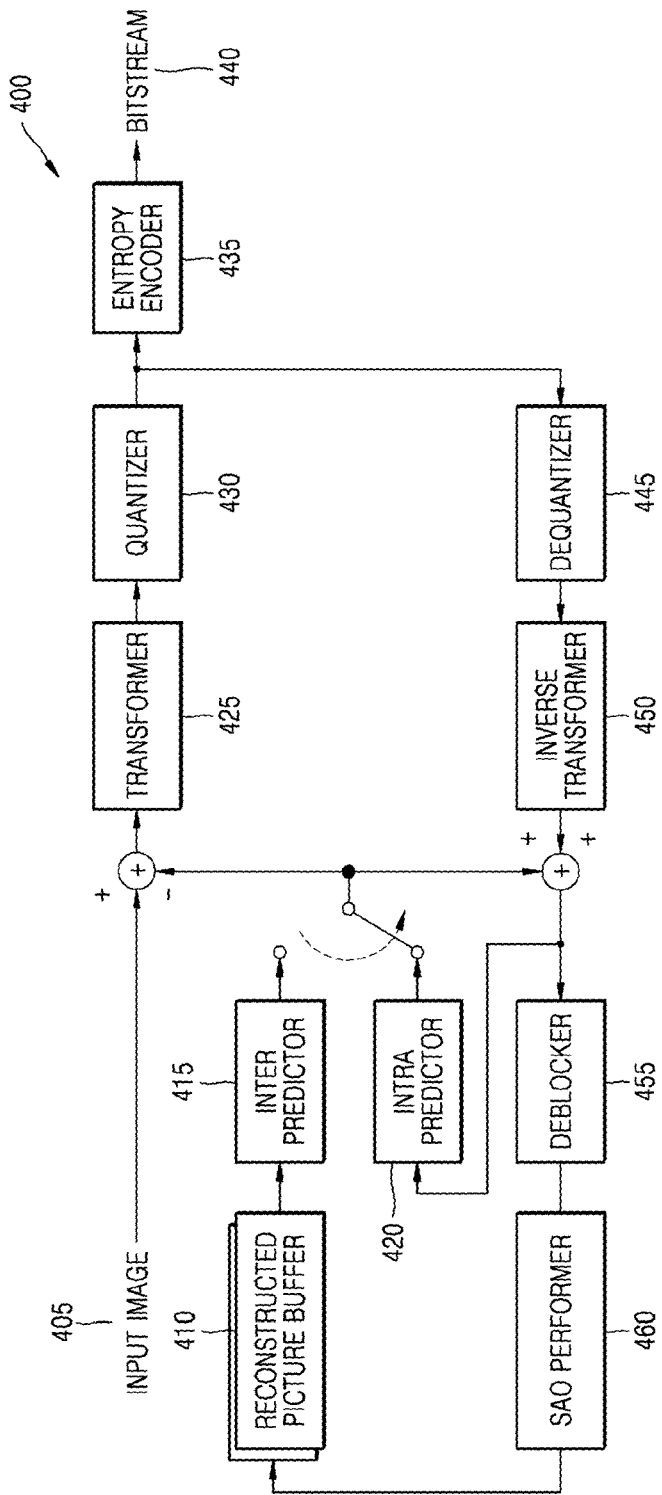
FIG. 10 is a block diagram of an image encoder based on coding units, according to various embodiments.

FIG. 10 is a block diagram of an image encoder 400 based on coding units, according to one or more embodiments.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residue data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue data in a space domain through a dequantizer 445 and an inverse transformer 450. The reconstructed residue data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocker 455 and an SAO performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units having a tree structure according to each LCU.

In particular, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Specifically, the intra predictor 420 and the inter predictor 415 may determine a partition mode and a prediction mode of each coding unit among the coding units having a tree structure in consideration of a maximum size and a maximum depth of a current LCU, and the transformer 425 may determine whether to split a transformation unit having a quad tree structure in each coding unit among the coding units having a tree structure.

Figure 11:
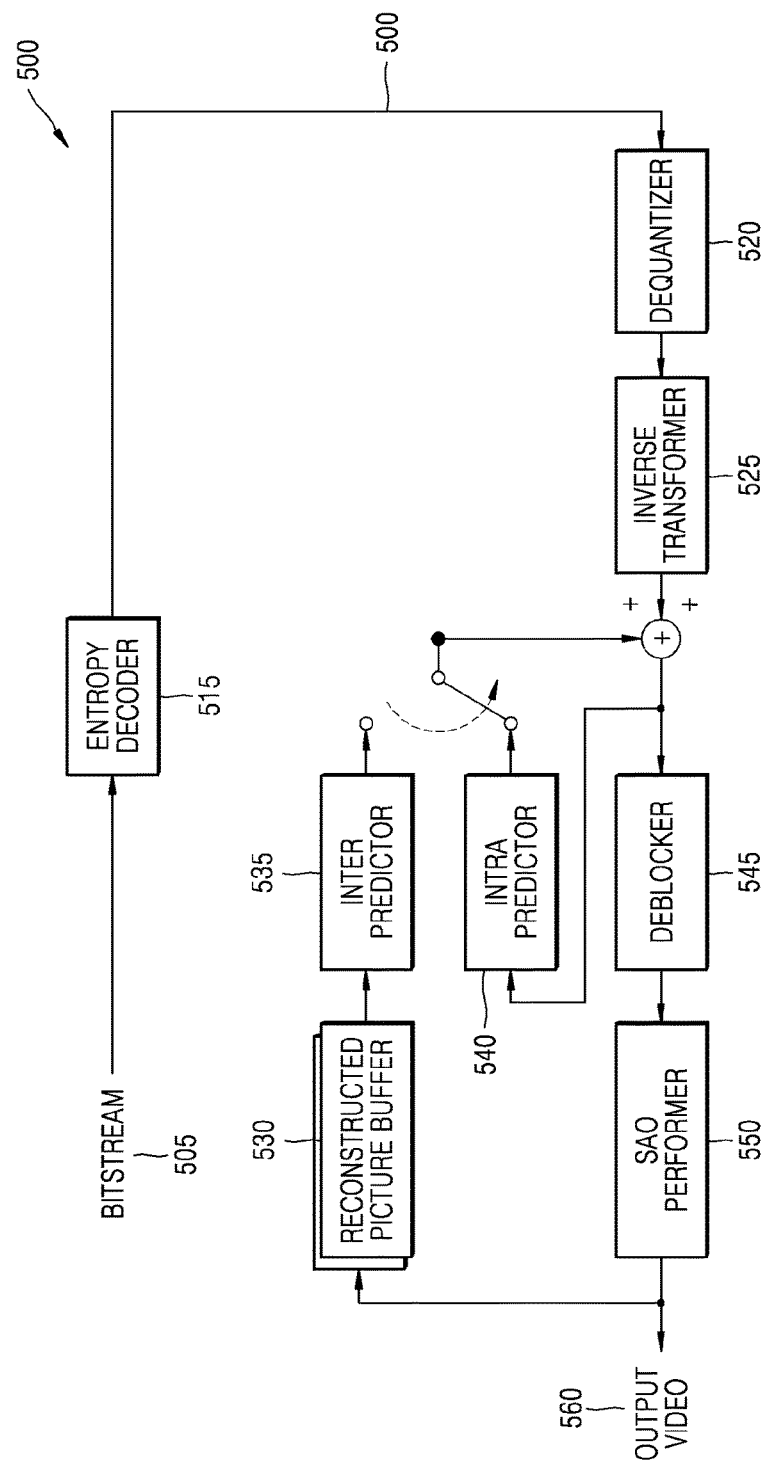
FIG. 11 is a block diagram of an image decoder based on coding units, according to various embodiments.

FIG. 11 is a block diagram of an image decoder 500 based on coding units, according to one or more embodiments.

An entropy decoder 515 parses encoded image data to be decoded and information about encoding required for decoding from a bitstream 505. The encoded image data is a quantized transformation coefficient from which residue data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue data regarding coding units of each mode, which passed through the intra predictor 540 and the inter predictor 535, are summed, and thus data in a space domain regarding coding units of the current image 405 may be reconstructed, and the reconstructed data in the space domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the dequantizer 520, the inverse transformer 525, the inter predictor 535, the de-blocker 545, and the SAO performer 550 may perform operations based on coding units having a tree structure for each LCU.

In particular, the SAO performer 550 and the inter predictor 535 may determine a partition and a prediction mode for each of the coding units having a tree structure, and the inverse transformer 525 may determine whether to split a transformation unit having a quad tree structure for each of the coding units.

The encoding operation of FIG. 10 and the encoding operation of FIG. 11 describe video stream encoding and decoding operations in a single layer, respectively. Thus, if the first layer encoder 12 of FIG. 1A encodes video streams of two or more layers, the image encoder 400 may be provided for each layer. Similarly, if the second layer decoder 26 of FIG. 2A decodes video streams of two or more layers, the image decoder 500 may be provided for each layer.

Figure 12:
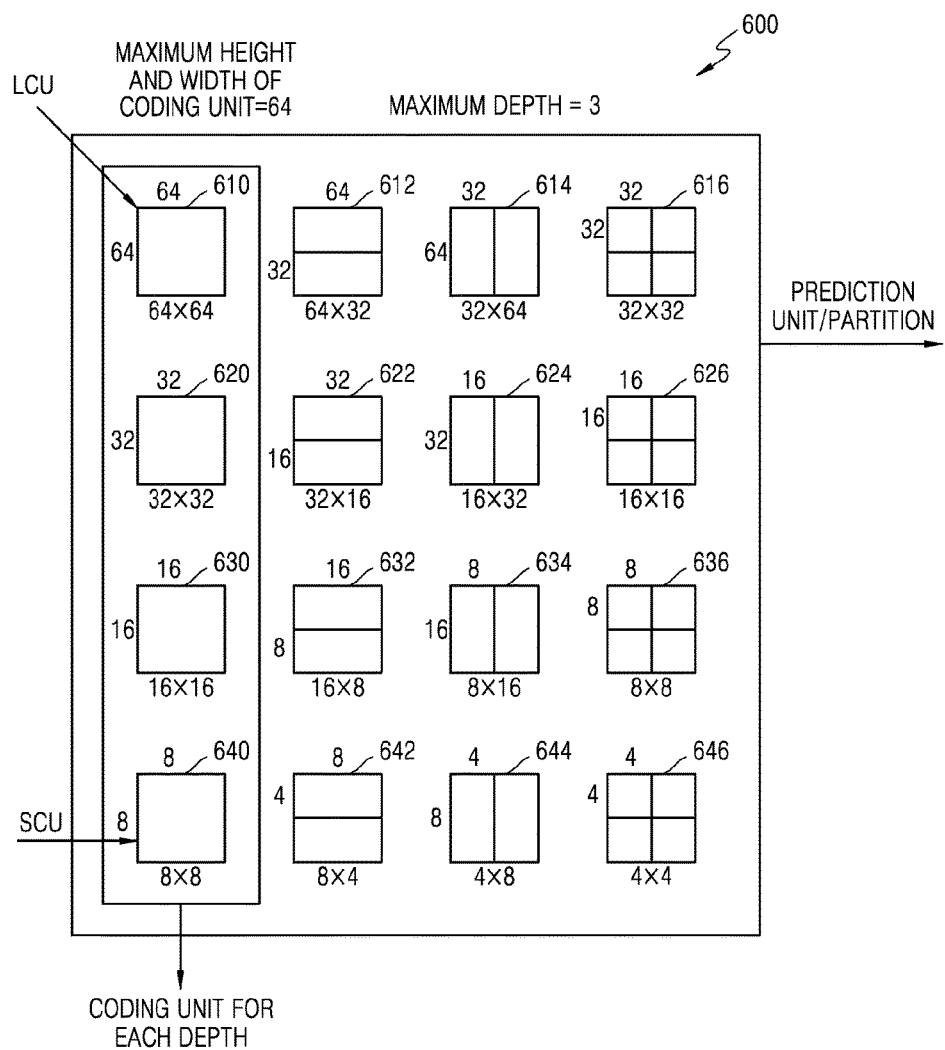
FIG. 12 is a diagram illustrating deeper coding units and partitions, according to various embodiments.

FIG. 12 is a diagram illustrating deeper coding units according to depths, and partitions, according to one or more embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a final depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

Figure 13:
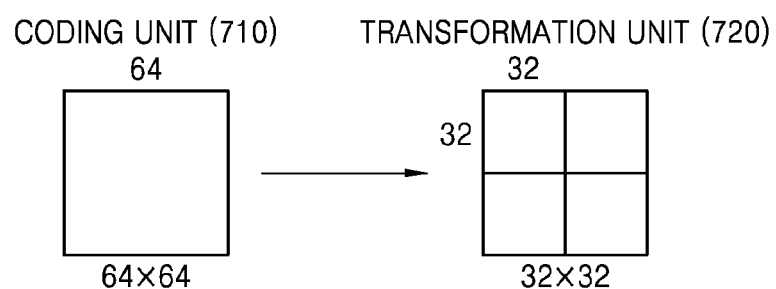
FIG. 13 is a diagram for describing a relationship between a coding unit and transformation units, according to various embodiments.

FIG. 13 is a diagram for describing a relationship between a coding unit 710 and transformation units 720, according to one or more embodiments.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 14:
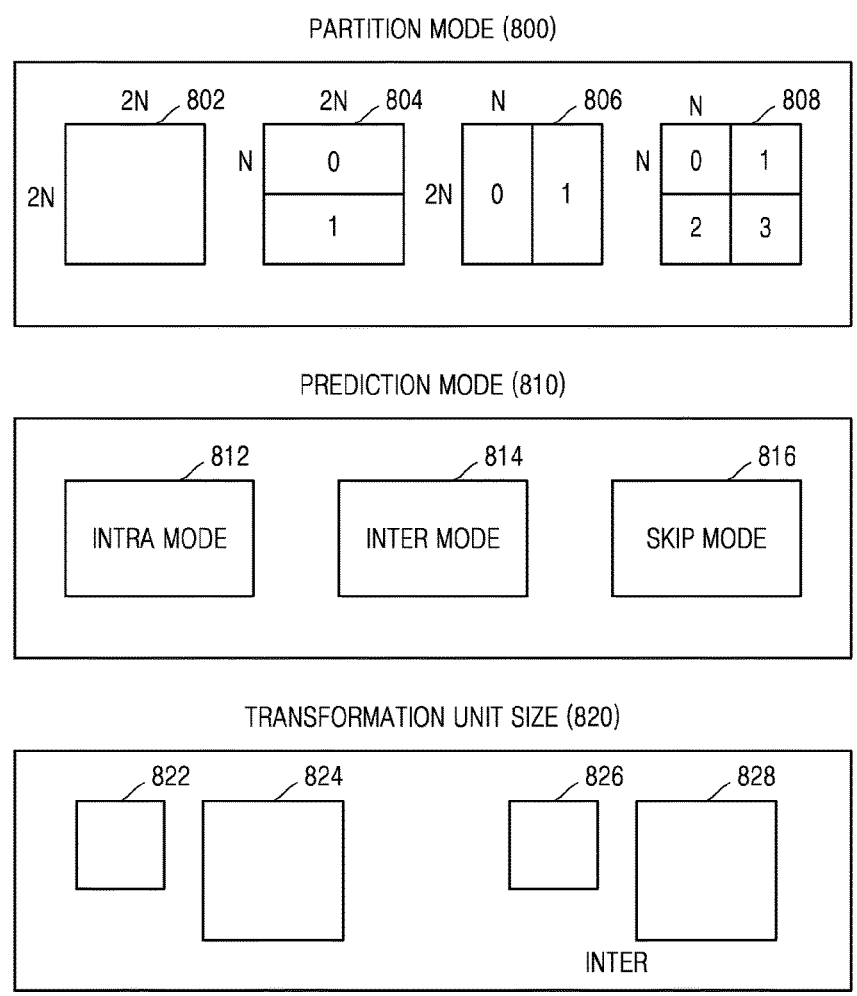
FIG. 14 is a diagram for describing encoding information of deeper coding units, according to various embodiments.

FIG. 14 is a diagram for describing encoding information of coding units corresponding to a depth, according to one or more embodiments.

The outputter 130 of the video encoding apparatus 100 may encode and transmit information 800 about a partition mode, information 810 about a prediction mode, and information 820 about a size of a transformation unit for each coding unit corresponding to a final depth, as information about an encoding mode.

The information 800 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition mode is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 15:
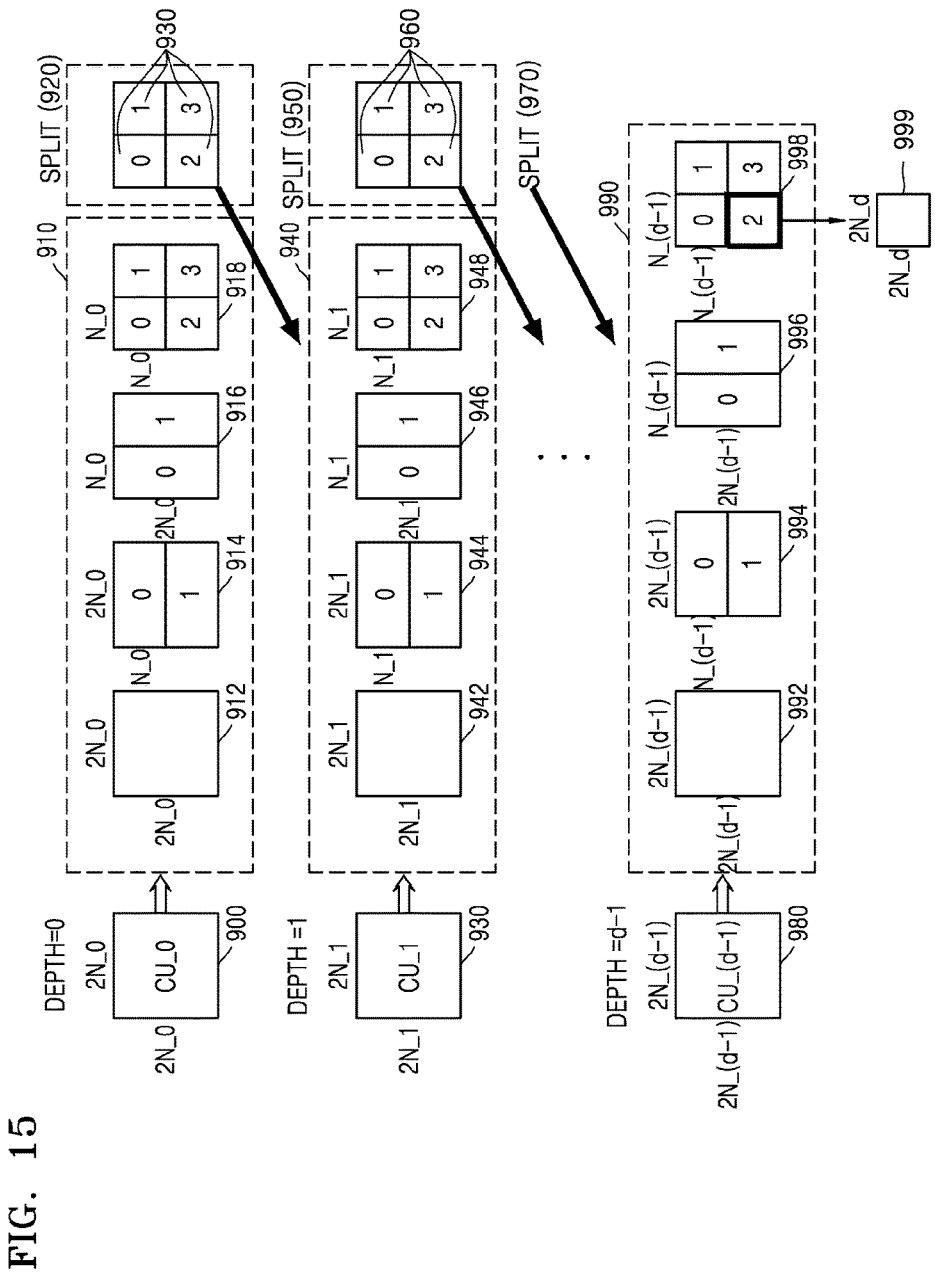
FIG. 15 is a diagram of deeper coding units, according to various embodiments.

FIG. 15 is a diagram of deeper coding units according to depths, according to one or more embodiments.

Splitting information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×

Figure 23:
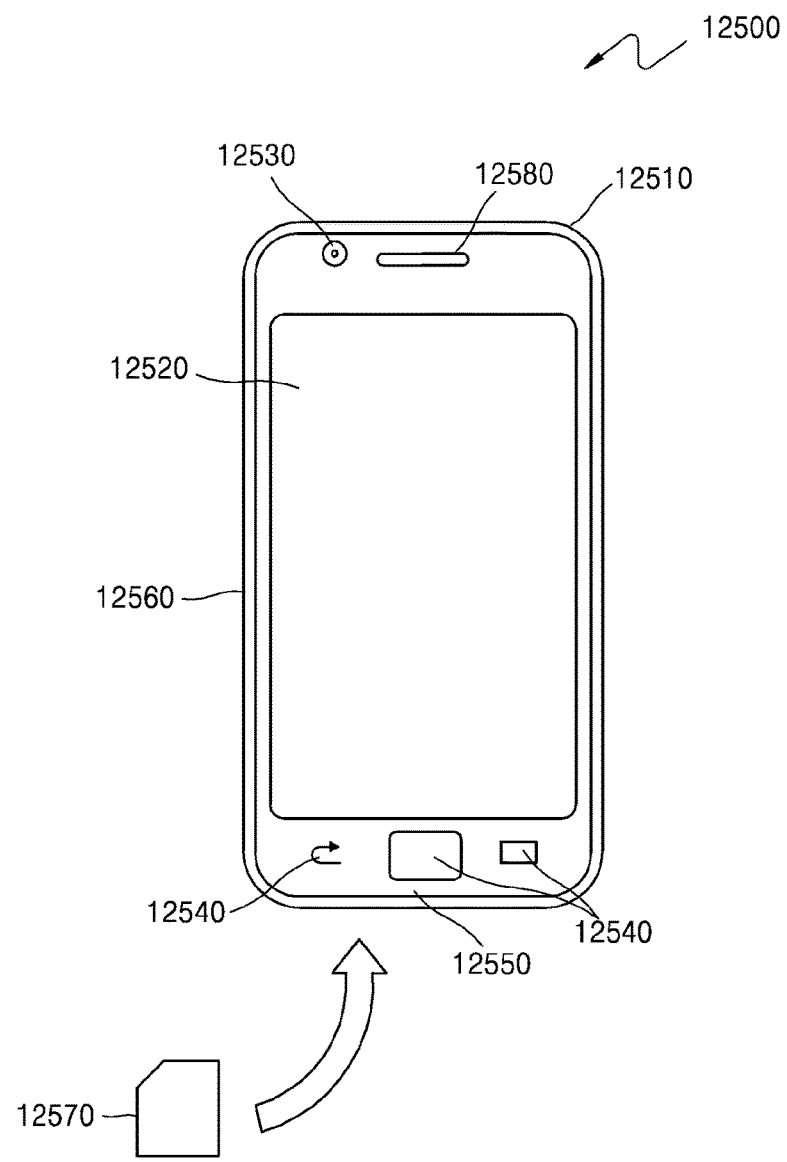
FIG. 23 is a diagram of an external structure of a mobile phone to which a video encoding method and a video decoding method are applied, according to various embodiments.

N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current LCU 900 is determined to be d−1 and a partition mode of the current LCU 900 may be determined to be N_(d−1)×N_(d−1). Also, since the maximum depth is d and an SCU 980 having a lowermost depth of d−1 is no longer split to a lower depth, splitting information for the SCU 980 is not set.

A data unit 999 may be a 'minimum unit' for the current LCU. A minimum unit according to one or more embodiments may be a square data unit obtained by splitting an SCU 980 by 4. By performing the encoding repeatedly, the video encoding apparatus 100 may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 220 of the video decoding apparatus 200 may extract and use the information about the depth and the prediction unit of the coding unit 900 to decode the partition 912. The video decoding apparatus 200 may determine a depth, in which splitting information is 0, as a depth by using splitting information according to depths, and use information about an encoding mode of the corresponding depth for decoding.

Figure 16:
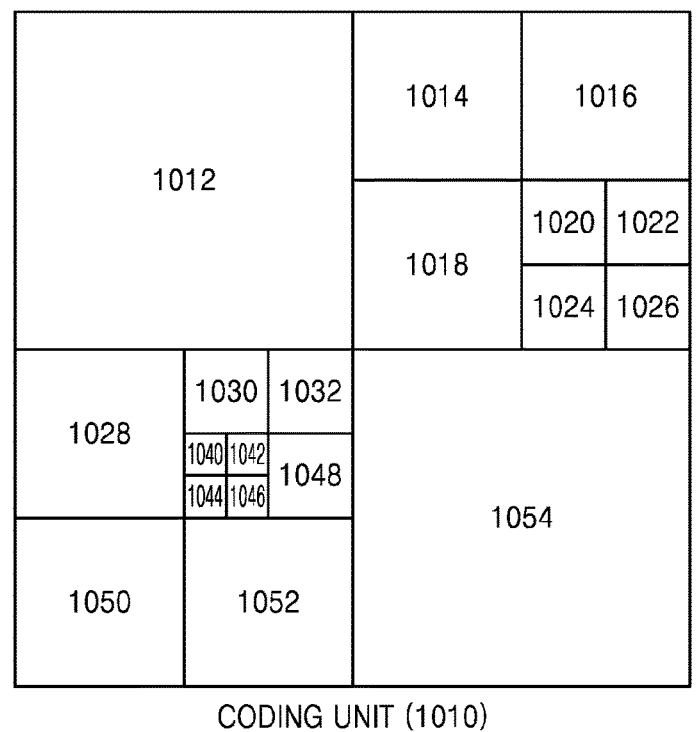
FIGS. 16 through 18 are diagrams for describing a relationship between coding units, prediction units, and transformation units, according to various embodiments.
Figure 17:
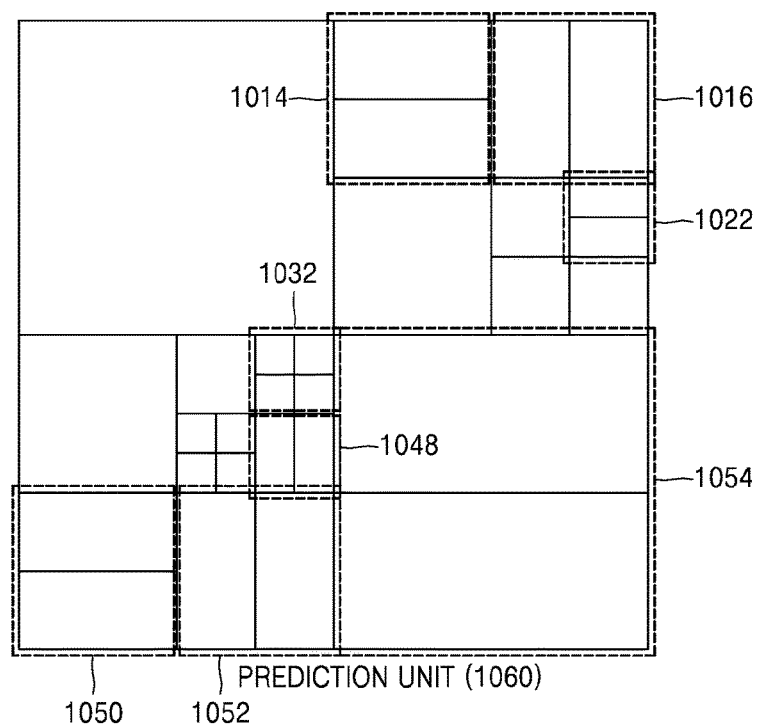
Figure 18:
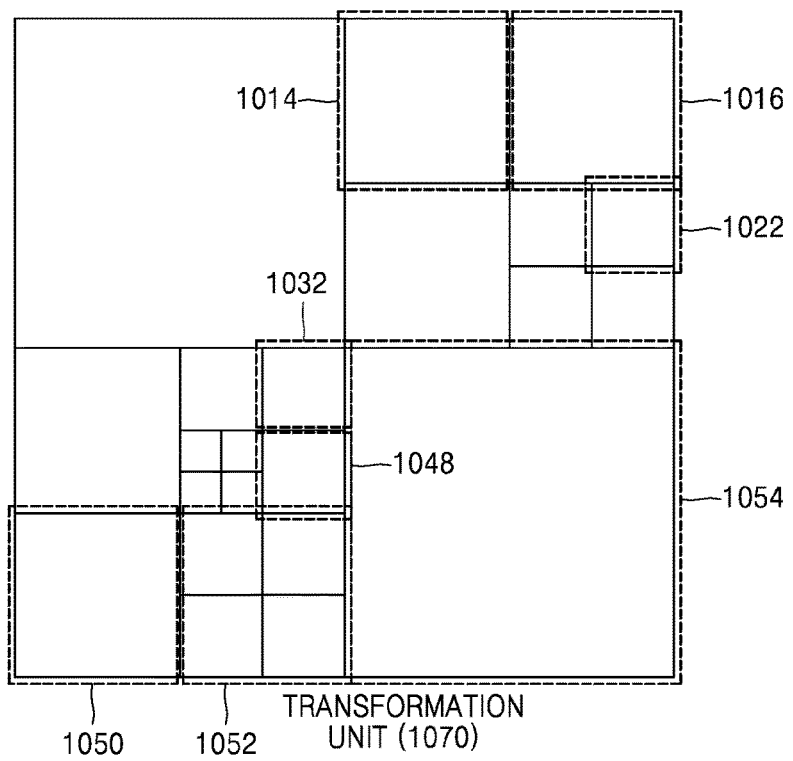

FIGS. 16 through 18 are diagrams for describing a relationship between coding units 1010, prediction units 1060, and transformation units 1070, according to one or more embodiments.

The coding units 1010 are coding units having a tree structure, corresponding to depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transformation unit. Table 4 shows the encoding information that may be set by the video encoding and decoding apparatuses 100 and 200.

having the size of 2N×2N is a symmetrical partition mode, a size of a transformation unit may be N×N, and if the partition mode of the current coding unit is an asymmetrical partition mode, the size of the transformation unit may be N/2×N/2.

TABLE 4

Splitting information 0
(Encoding on Coding Unit having Size of 2N × 2N and Current Depth of d)

| | | | Size of Transformation Unit | | |
|---|---|---|---|---|---|
| Prediction Mode | Partition mode | | Splitting information 0 of Transformation Unit | Splitting information 1 of Transformation Unit | Splitting information 1 |
| | Symmetrical Partition mode | Asymmetrical Partition mode | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a final depth, and thus information about a partition mode, prediction mode, and a size of a transformation unit may be defined for the final depth. If the current coding unit is further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if splitting information of the transformation unit is 0, the size of the transformation unit may be 2N×2N, which is the size of the current coding unit. If splitting information of the transformation unit is 1, the transformation units may be obtained by splitting the current coding unit. Also, if a partition mode of the current coding unit The encoding information about coding units having a tree structure may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 19:
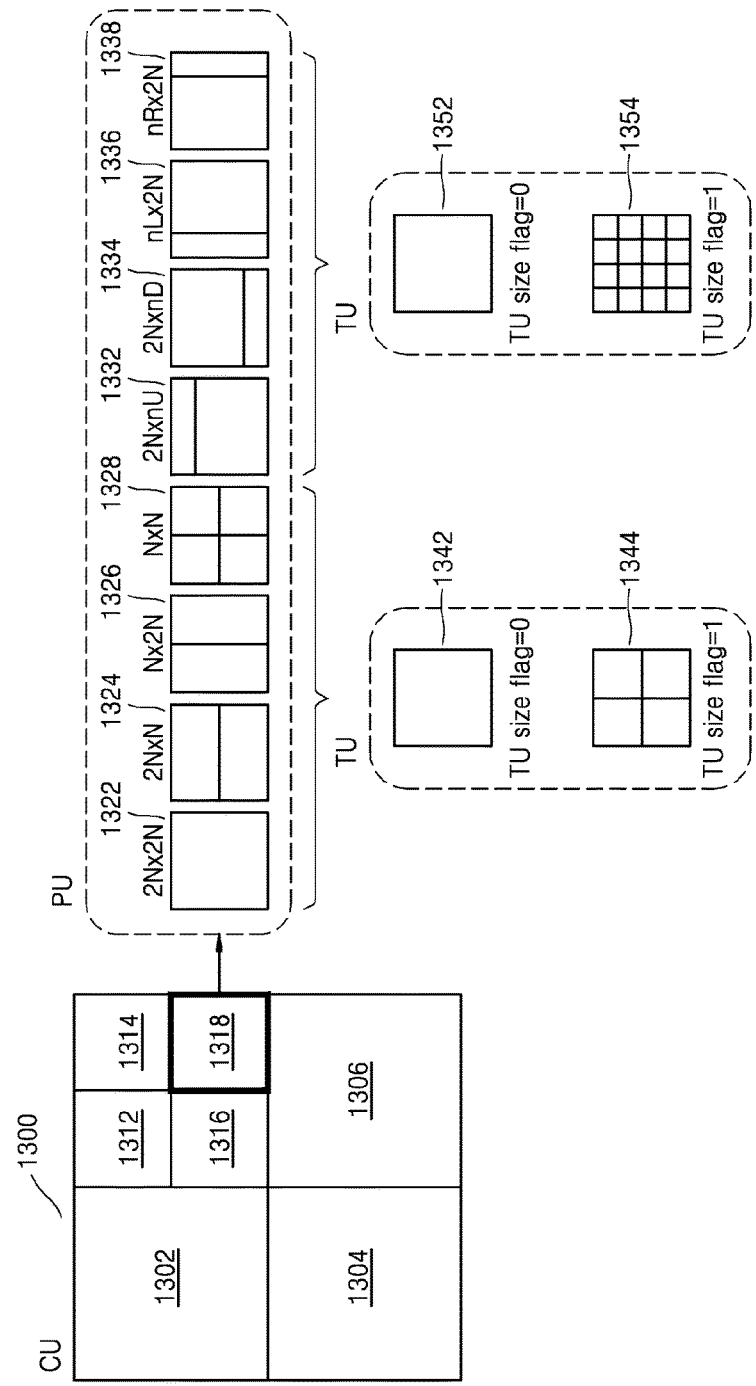
FIG. 19 is a diagram for describing a relationship between a coding unit, a prediction unit, and a transformation unit, according to encoding mode information of Table 1.

FIG. 19 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of depths. Here, since the coding unit 1318 is a coding unit of a depth, splitting information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Splitting information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to one or more embodiments, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to one or more embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units having a tree structure as described with reference to FIGS. 7 through 19, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter layer video encoding method and/or the video encoding method described above with reference to FIGS. 1A through 19, will be referred to as a 'video encoding method according to the various embodiments'. In addition, the inter layer video decoding method and/or the video decoding method described above with reference to FIGS. 1A through 19, will be referred to as a 'video decoding method according to the various embodiments'.

A video encoding apparatus including the inter layer video encoding apparatus 10, the video encoding apparatus 100, or the image encoder 400, which is described above with reference to FIGS. 1A through 19, will be referred to as a 'video encoding apparatus according to the various embodiments'. In addition, a video decoding apparatus including the inter layer video decoding apparatus 20, the video decoding apparatus 200, or the image decoder 500, which is described above with reference to FIGS. 1A through 19, will be referred to as a 'video decoding apparatus according to the various embodiments'.

A computer-readable recording medium storing a program, e.g., a disc 26000, according to various embodiments will now be described in detail.

Figure 20:
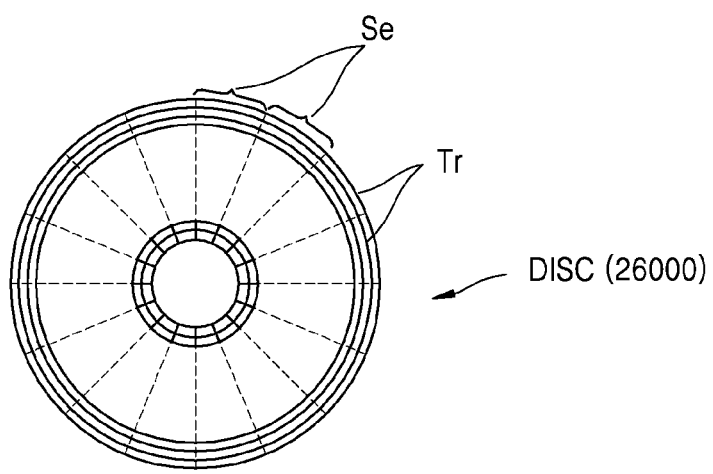
FIG. 20 is a diagram of a physical structure of a disc in which a program is stored, according to various embodiments.

FIG. 20 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 21:
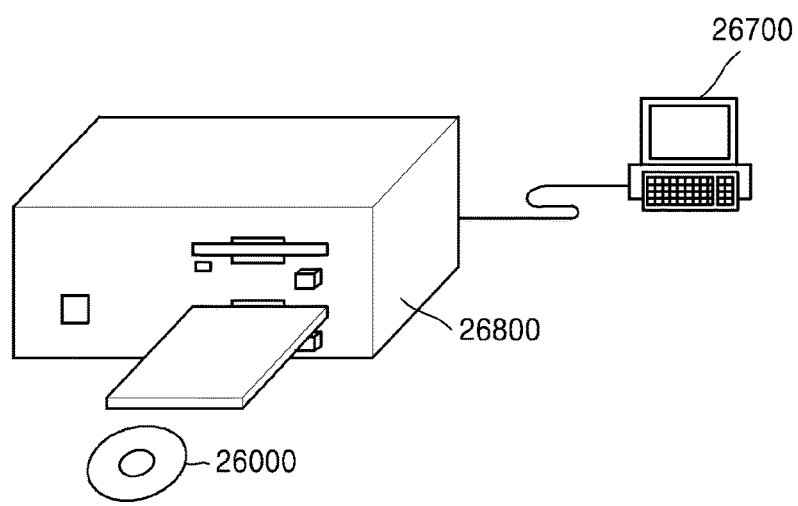
FIG. 21 is a diagram of a disc drive for recording and reading a program by using a disc.

FIG. 21 is a diagram of a disc drive 26800 for recording and reading a program by using the disc 26000. A computer system 26700 may store a program that executes at least one of a video encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to one or more embodiments may be stored not only in the disc 26000 illustrated in FIG. 20 or 21 but also in a memory card, a ROM cassette, or a solid state drive (SSD).

A system to which the video encoding method and a video decoding method described above are applied will be described below.

Figure 22:
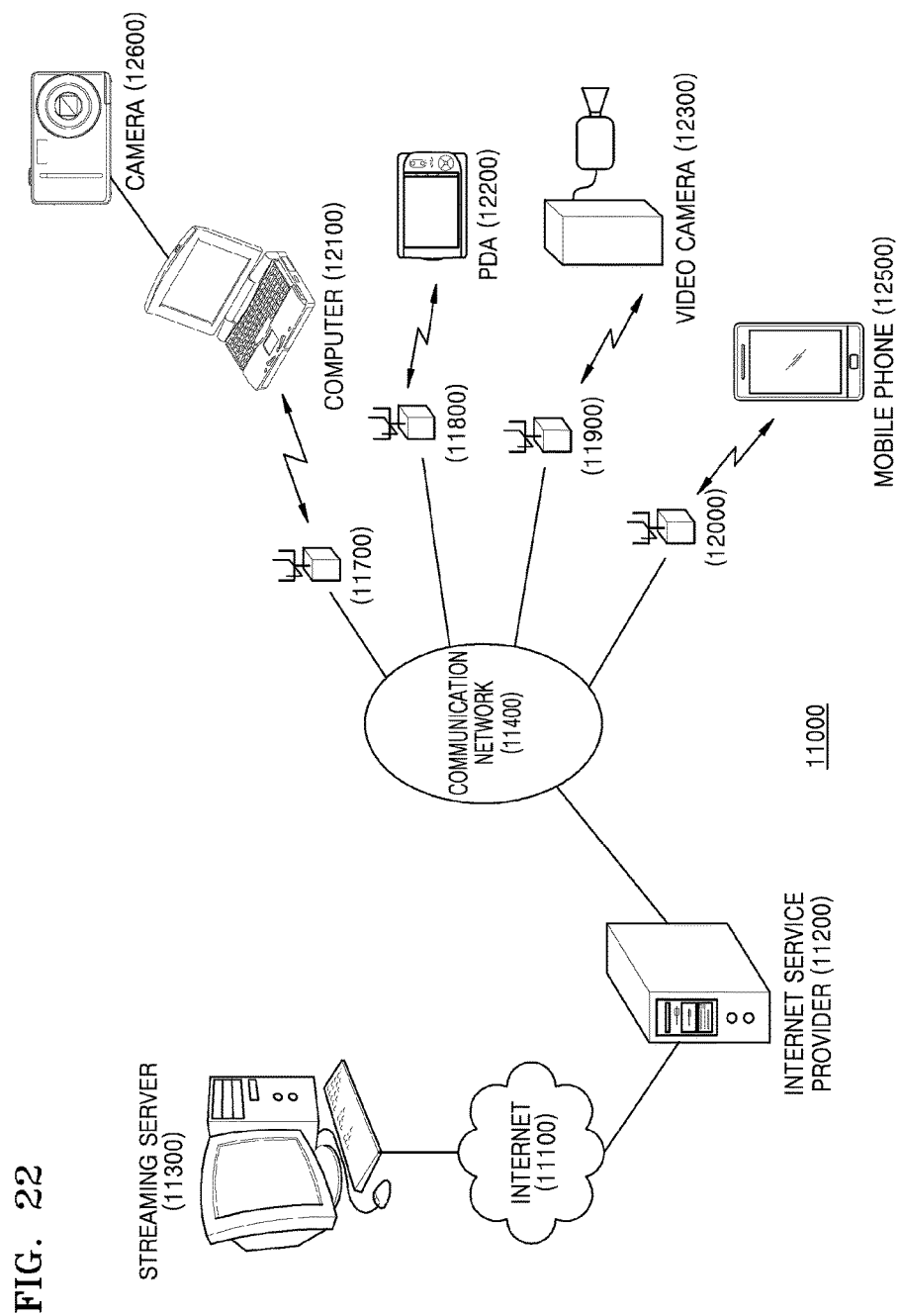
FIG. 22 is a diagram of an overall structure of a content supply system for providing a content distribution service.

FIG. 22 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more embodiments.

The mobile phone 12500 included in the content supply system 11000 according to one or more embodiments will now be described in greater detail with referring to FIGS. 23 and 24.

FIG. 23 illustrates an external structure of the mobile phone 12500 to which a video encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 24:
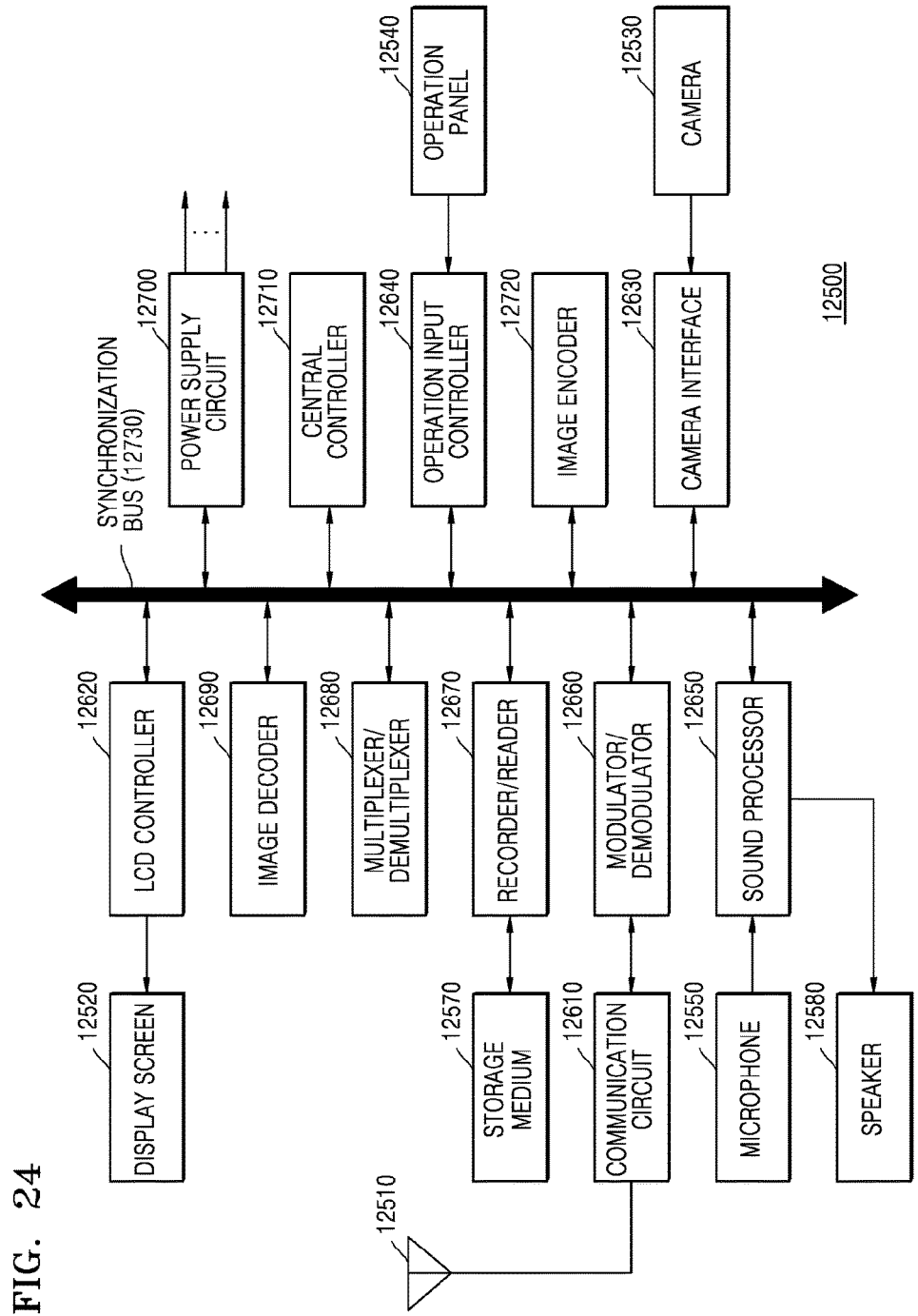
FIG. 24 is a diagram of an internal structure of a mobile phone.

FIG. 24 illustrates an internal structure of the mobile phone 12500, according to one or more embodiments. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the one or more embodiments. The image encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more embodiments, may be a transceiving terminal including only the video encoding apparatus, or may be a transceiving terminal including only the video decoding apparatus.

Figure 25:
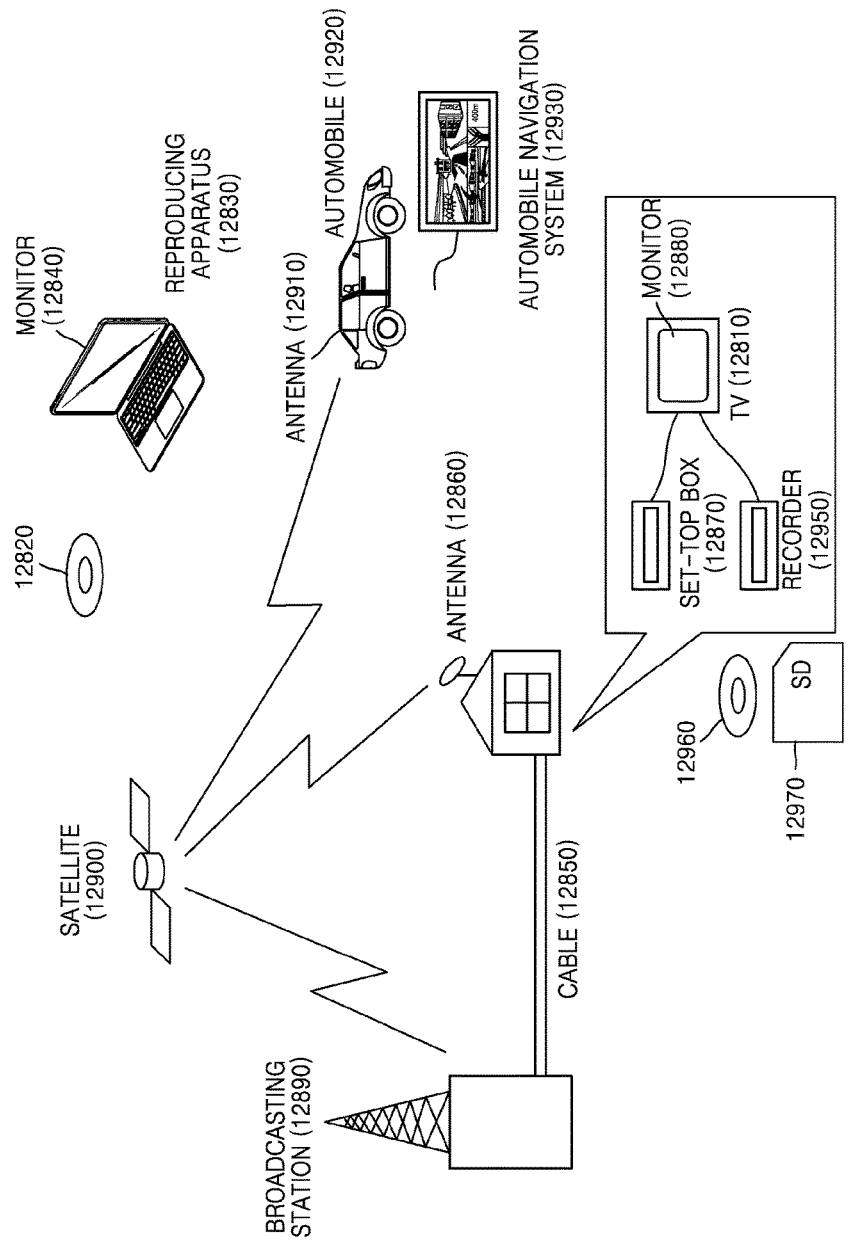
FIG. 25 is a diagram of a digital broadcast system to which a communication system is applied, according to various embodiments.

A communication system according to the one or more embodiments is not limited to the communication system described above with reference to FIG. 24. For example, FIG. 25 illustrates a digital broadcasting system employing a communication system, according to one or more embodiments. The digital broadcasting system of FIG. 25 may receive a digital broadcast transmitted via a satellite or a terrestrial network by using a video encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by a video encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

Figure 26:
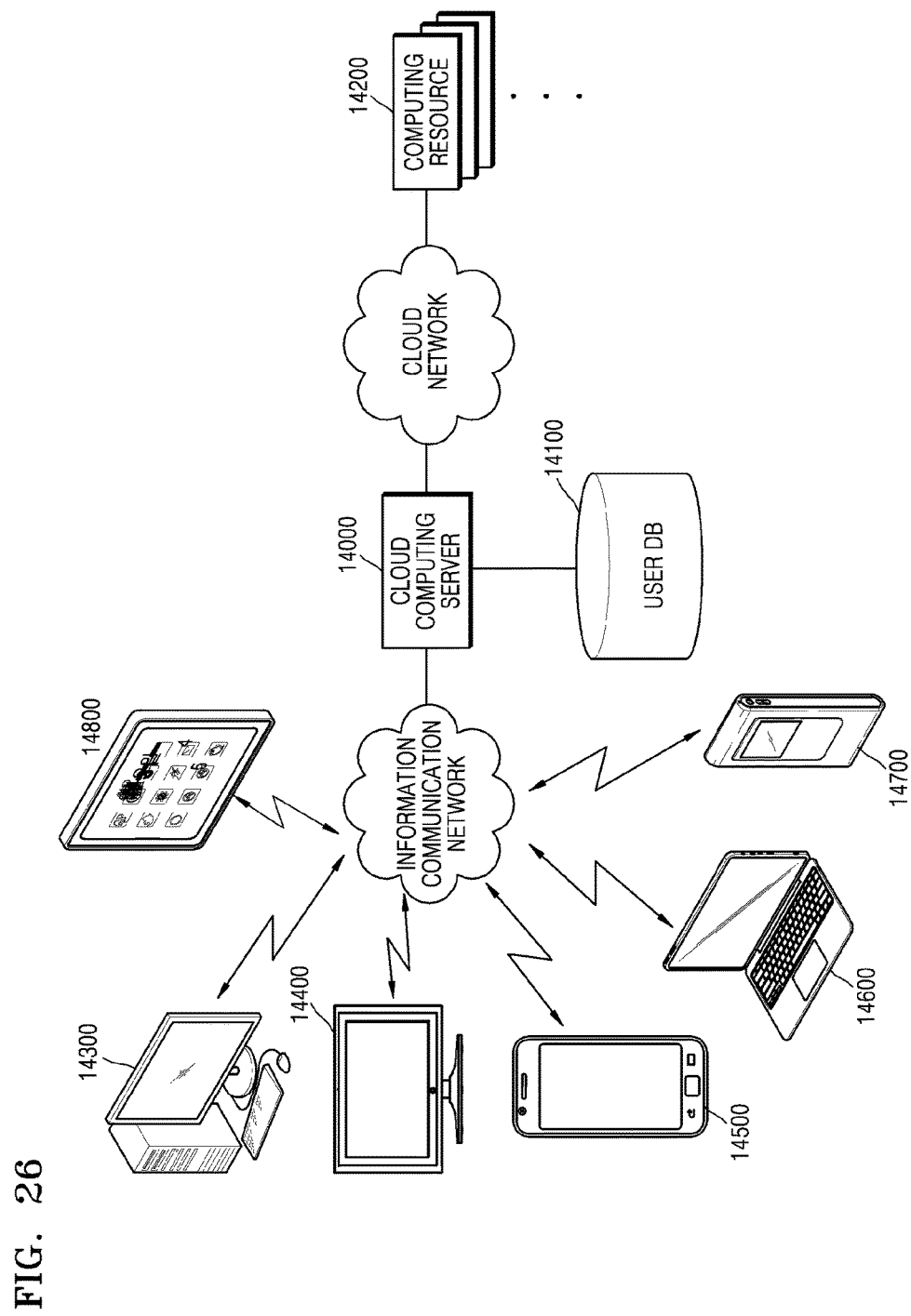
FIG. 26 is a diagram illustrating a network structure of a cloud computing system using a video encoding apparatus and a video decoding apparatus, according to various embodiments.

The automobile navigation system 12930 may not include the camera 12530 of FIG. 26, and the camera interface 12630 and the image encoder 12720 of FIG. 26. For example, the computer 12100 and the TV receiver 12810 may not include the camera 12530, the camera interface 12630, and the image encoder 12720.

FIG. 26 is a diagram illustrating a network structure of a cloud computing system using a video encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 19. As another example, the user terminal may include a video encoding apparatus as described above with reference to FIGS. 1A through 19. Alternatively, the user terminal may include both the video decoding apparatus and the video encoding apparatus as described above with reference to FIGS. 1A through 19.

Various applications of a video encoding method, a video decoding method, a video encoding apparatus, and a video decoding apparatus according to the one or more embodiments described above with reference to FIGS. 1A through 19 have been described above with reference to FIGS. 20 to 26. However, methods of storing the video encoding method and the video decoding method in a storage medium or methods of implementing the video encoding apparatus and the video decoding apparatus in a device, according to various embodiments, described above with reference to FIGS. 1A through 19 are not limited to the embodiments described above with reference to FIGS. 20 to 26.

In an interlayer video encoding or decoding method, multi-layer video encoding or decoding efficiency may be improved as an amount of arithmetic operations is reduced by adaptively performing luminance compensation and a reference block that is located outside a boundary of a reference layer image is used.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An interlayer video decoding method comprising:
reconstructing a first layer image based on encoding information acquired from a first layer bitstream;
reconstructing a second layer current block by using interlayer prediction information acquired from a second layer bitstream and a first layer reference block corresponding to the second layer current block that is to be reconstructed in a first layer reconstruction image;
selecting a luminance compensation model to be applied to the first layer reference block and determining a luminance compensation parameter for the selected luminance compensation model; and
compensating for luminance of the first layer reference block by using the luminance compensation parameter and reconstructing a second layer image comprising the second layer current block,
wherein the determining of the luminance compensation parameter comprises determining the luminance compensation parameter based on any one of a color component of the second layer current block, information about a type of a picture comprising the second layer current block, and a prediction mode of the second layer current block.

2. The interlayer video decoding method of claim 1, wherein the selecting of the luminance compensation model and the determining of the luminance compensation parameter comprise:
selecting any one of a first luminance compensation model and a second luminance compensation model, wherein the first luminance compensation model is configured to compensate for luminance of the first layer reference block by determining a scale factor and a first offset and by adding the first offset to a value that is produced by multiplying each pixel value of the first layer reference block and the scale factor, and the second luminance compensation model is configured to compensate for the luminance of the first layer reference block by determining a second offset and adding the second offset to each pixel value of the first layer reference block;
determining the scale factor and the first offset when the first luminance compensation model is selected; and
determining the second offset when the second luminance compensation model is selected.

3. The interlayer video decoding method of claim 2, wherein the selecting of the luminance compensation model comprises selecting the first luminance compensation model when the color component of the second layer current block is a luma component and selecting the second luminance compensation model when the color component of the second layer current block is a chroma component.

4. The interlayer video decoding method of claim 2, wherein the selecting of the luminance compensation model comprises selecting the first luminance compensation model when the second layer current block is a block comprised in a texture picture and selecting the second luminance compensation model when the second layer current block is a block comprised in a depth map picture.

5. The interlayer video decoding method of claim 2, wherein the selecting of the luminance compensation model comprises selecting the first luminance compensation model when the prediction mode of the second layer current block is not a view synthesis prediction mode and selecting the second luminance compensation model when the prediction mode of the second layer current block is the view synthesis prediction mode.

6. The interlayer video decoding method of claim 2, wherein the selecting of the luminance compensation model comprises selecting the second luminance compensation model when any one of conditions is satisfied and selecting the first luminance compensation model when all of the conditions are not satisfied, wherein the conditions are that the color component of the second layer current block is a chroma component, the second layer current block is a block comprised in a depth map picture, and the prediction mode of the second layer current block is a view synthesis prediction mode.

7. An interlayer video decoding method comprising:
reconstructing a first layer image based on encoding information acquired from a first layer bitstream;
reconstructing a second layer current block by using interlayer prediction information acquired from a second layer bitstream and a first layer reference block corresponding to the second layer current block that is to be reconstructed in a first layer reconstruction image;
determining a luminance compensation parameter to be applied to the first layer reference block; and
compensating for luminance of the first layer reference block by using the luminance compensation parameter and reconstructing a second layer image comprising the second layer current block,
wherein, the determining of the luminance compensation parameter comprises, when the first layer reference block is located outside a boundary of the first layer reconstruction image, replacing a region outside the boundary and peripheral pixels of the region with pixels that are located inside the boundary of the first layer reconstruction image, and
wherein the determining of the luminance compensation parameter further comprises determining the luminance compensation parameter based on any one of a color component of the second layer current block, information about a type of a picture comprising the second layer current block, and a prediction mode of the second layer current block.

8. The interlayer video decoding method of claim 7, wherein the replacing comprises padding pixels by replacing a section, ranging from the boundary of the first layer reconstruction image to an outer region of a boundary of the first layer reference block, with pixels that are located on the boundary of the first layer reconstruction image.

9. An interlayer video encoding method comprising:
generating a first layer bitstream comprising encoding information generated by encoding a first layer image;
reconstructing a second layer current block by using a first layer reference block corresponding to the second layer current block to be reconstructed in a first layer reconstruction image;
selecting a luminance compensation model to be applied to the first layer reference block and determining a luminance compensation parameter for the selected luminance compensation model; and
generating a second layer bitstream comprising interlayer prediction information between the first layer reference block and the second layer current block of which luminance is to be compensated for by using the luminance compensation parameter,
wherein the determining of the luminance compensation parameter comprises determining the luminance compensation parameter based on any one of a color component of the second layer current block, information about a type of a picture comprising the second layer current block, and a prediction mode of the second layer current block.

10. The interlayer video encoding method of claim 9, wherein the determining of the luminance compensation parameter comprises:
selecting any one of a first luminance compensation model and a second luminance compensation model, wherein the first luminance compensation model is configured to compensate for luminance of the first layer reference block by determining a scale factor and a first offset and by adding the first offset to a value that is produced by multiplying each pixel value of the first layer reference block and the scale factor, and the second luminance compensation model is configured to compensate for the luminance of the first layer reference block by determining a second offset and adding the second offset to each pixel value of the first layer reference block;
determining the scale factor and the first offset when the first luminance compensation model is selected; and
determining the second offset when the second luminance compensation model is selected.

11. The interlayer video encoding method of claim 10, wherein selecting of the luminance compensation model comprises selecting the second luminance compensation model when any one of conditions is satisfied and selecting the first luminance compensation model when all of the conditions are not satisfied, wherein the conditions are that the color component of the second layer current block is a chroma component, the second layer current block is a block comprised in a depth map picture, and the prediction mode of the second layer current block is a view synthesis prediction mode.

12. An interlayer video encoding method comprising:
reconstructing a first layer image based on encoding information acquired from a first layer bitstream;
reconstructing a second layer current block by using interlayer prediction information acquired from a second layer bitstream and a first layer reference block corresponding to the second layer current block to be reconstructed in a first layer reconstruction image;
determining a luminance compensation parameter to be applied to the first layer reference block; and
reconstructing a second layer image comprising the second layer current block by compensating for luminance of the first layer reference block by using the luminance compensation parameter,
wherein the determining of the luminance compensation parameter comprises, when the first layer reference block is located outside a boundary of the first layer reconstruction image, replacing a region outside the boundary and peripheral pixels of the region with pixels that are located inside the boundary of the first layer reconstruction image, and
wherein the determining of the luminance compensation parameter further comprises determining the luminance compensation parameter based on any one of a color component of the second layer current block, information about a type of a picture comprising the second layer current block, and a prediction mode of the second layer current block.

13. The interlayer video encoding method of claim 12, wherein the replacing comprises replacing a section, ranging from the boundary of the first layer reconstruction image to an outer region of a boundary of the first layer reference block, with pixels that are located on the boundary of the first layer reconstruction image and padding the pixels.

14. An interlayer video decoding apparatus comprising:
a first layer decoder configured to reconstruct a first layer image based on encoding information acquired from a first layer bitstream;
a second layer decoder configured to reconstruct a second layer current block by using interlayer prediction information acquired from a second layer bitstream and a first layer reference block corresponding to the second layer current block that is to be reconstructed in a first layer reconstruction image; and
a luminance compensation determiner configured to select a luminance compensation model to be applied to the first layer reference block and determine a luminance compensation parameter for the selected luminance compensation model,
wherein the luminance compensation determiner is further configured to determine the luminance compensation parameter based on any one of a color component of the second layer current block, information about a type of a picture comprising the second layer current block, and a prediction mode of the second layer current block, and
the second layer decoder is further configured to compensate for luminance of the first layer reference block by using the luminance compensation parameter and reconstruct a second layer image comprising the second layer current block.

15. An interlayer video encoding apparatus comprising:
a first layer encoder configured to generate a first layer bitstream comprising encoding information generated by encoding a first layer image;
a second layer encoder configured to reconstruct a second layer current block by using a first layer reference block corresponding to the second layer current block to be reconstructed in a first layer reconstruction image; and
a luminance compensation determiner configured to select a luminance compensation model to be applied to the first layer reference block and determine a luminance compensation parameter for the selected luminance compensation model,
wherein the luminance compensation determiner is further configured to determine the luminance compensation parameter based on any one of a color component of the second layer current block, information about a type of a picture comprising the second layer current block, and a prediction mode of the second layer current block, and
the second layer encoder is further configured to generate a second layer bitstream comprising interlayer prediction information between the first layer reference block and the second layer current block of which luminance is compensated for by using the luminance compensation parameter.

* * * * *